United States Patent
Kawamoto et al.

(10) Patent No.: US 9,225,158 B2
(45) Date of Patent: Dec. 29, 2015

(54) OVERCURRENT PROTECTION CIRCUIT

(75) Inventors: Ippei Kawamoto, Kariya (JP);
Takeyoshi Hisada, Hekinan (JP); Fukuo Ishikawa, Kariya (JP); Akira Sugiura, Okazaki (JP)

(73) Assignees: DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 409 days.

(21) Appl. No.: 13/611,389

(22) Filed: Sep. 12, 2012

(65) Prior Publication Data

US 2013/0063850 A1    Mar. 14, 2013

(30) Foreign Application Priority Data

Sep. 14, 2011 (JP) ................. 2011-200577
Sep. 28, 2011 (JP) ................. 2011-212586
May 17, 2012 (JP) ................. 2012-113681

(51) Int. Cl.
*H02H 3/00* (2006.01)
*H02H 3/08* (2006.01)
*H02H 9/08* (2006.01)

(52) U.S. Cl.
CPC .................... *H02H 3/08* (2013.01)

(58) Field of Classification Search
CPC ........... H02H 3/08; H02H 9/02; H02H 9/025; H02M 1/32; H03K 17/0822
USPC ................. 361/87, 93.1, 93.9, 93.2
See application file for complete search history.

(56) References Cited

U.S. PATENT DOCUMENTS

| | | | |
|---|---|---|---|
| 5,898,557 A | 4/1999 | Baba et al. | |
| 6,768,313 B1 * | 7/2004 | Hamai et al. | 324/537 |
| 8,089,742 B2 * | 1/2012 | Ohshima | 361/93.8 |
| 2006/0220605 A1 * | 10/2006 | Funabashi et al. | 318/434 |
| 2007/0103822 A1 | 5/2007 | Bilac et al. | |

(Continued)

FOREIGN PATENT DOCUMENTS

| | | |
|---|---|---|
| JP | S45-38950 B | 12/1970 |
| JP | S58-95922 A | 6/1983 |

(Continued)

OTHER PUBLICATIONS

Office Action mailed Jul. 22, 2014 issued in corresponding JP patent application No. 2011-200577 (and English translation).

(Continued)

*Primary Examiner* — Thienvu Tran
*Assistant Examiner* — Lucy Thomas
(74) *Attorney, Agent, or Firm* — Posz Law Group, PLC

(57) ABSTRACT

An overcurrent protection circuit includes a load drive section driving a load, a wire coupled with the load and the load drive section, a current detection section detecting a load current value of an electric current that flows to the load, an addition and subtraction section determining an addition and subtraction value based on the load current value and transmitting an integration result of addition and subtraction, a comparison circuit comparing the integration result with a threshold value, and a control circuit controlling the load drive section based on the comparison result. The addition and subtraction section includes an addition value determination circuit that determines an addition value in the addition and subtraction value based on the load current value and a function expression or information indicating a relationship between the load current value and the addition value.

26 Claims, 15 Drawing Sheets

(56) References Cited

U.S. PATENT DOCUMENTS

| | | |
|---|---|---|
| 2011/0080681 A1 | 4/2011 | Maruyama et al. |
| 2011/0085275 A1* | 4/2011 | Ohshima .................... 361/93.7 |
| 2011/0216448 A1 | 9/2011 | Hisada et al. |
| 2012/0176115 A1 | 7/2012 | Higuchi et al. |

FOREIGN PATENT DOCUMENTS

| | | |
|---|---|---|
| JP | 2003-061392 A | 2/2003 |
| JP | A-2009-142146 | 6/2009 |
| JP | A-2010-279158 | 12/2010 |
| JP | 2011-085470 A | 4/2011 |

OTHER PUBLICATIONS

Office Action mailed Mar. 10, 2015 issued in corresponding JP patent application No. 2012-113681 (and English translation).

* cited by examiner

| CURRENT VALUE | $I_1$ | $I_2$ | $I_3$ | $I_4$ | $I_5$ | ... |
|---|---|---|---|---|---|---|
| ADDITION VALUE | $A_1$ | $A_2$ | $A_3$ | $A_4$ | $A_5$ | ... |

FIG. 6A

FIRST LINE TYPE

| CURRENT VALUE | $I_1$ | $I_2$ | $I_3$ | $I_4$ | $I_5$ | ... |
|---|---|---|---|---|---|---|
| ADDITION VALUE | $A_1$ | $A_2$ | $A_3$ | $A_4$ | $A_5$ | ... |

FIG. 6B

SECOND LINE TYPE

| CURRENT VALUE | $I_1$ | $I_2$ | $I_3$ | $I_4$ | $I_5$ | ... |
|---|---|---|---|---|---|---|
| ADDITION VALUE | $A_1$ | $A_2$ | $A_3$ | $A_4$ | $A_5$ | ... |

FIG. 11

| DETECTION CURRENT RANGE (A) | | ADDITION VALUE | SUBTRACTION VALUE |
|---|---|---|---|
| ID1- | 60 ≤ | 36000 | $X^2 \times 10$ |
| ID2-1 | 45 - 60 | 20250 | $X^2 \times 10$ |
| ID3-2 | 30 - 45 | 9000 | $X^2 \times 10$ |
| ID4-3 | 15 - 30 | 2250 | $X^2 \times 10$ |
| ID5-4 | X - 15 | $X^2 \times 10$ | $X^2 \times 10$ |
| ID6-5 | Y - X | $Y^2 \times 10$ | $X^2 \times 10$ |
| ID7-6 | 5 - Y | 250 | $X^2 \times 10$ |
| ID8-7 | 2 - 5 | 40 | $X^2 \times 10$ |
| -ID8 | < 2 | 0 | $X^2 \times 10$ |

FIG. 16

| DETECTION CURRENT RANGE (I) | ADDITION VALUE | SUBTRACTION VALUE |
|---|---|---|
| ID1 ≦ I | 128 | −1 |
| ID2 ≦ I < ID1 | 64 | −1 |
| ID3 ≦ I < ID2 | 32 | −1 |
| ID4 ≦ I < ID3 | 16 | −1 |
| ID5 ≦ I < ID4 | 8 | −1 |
| ID6 ≦ I < ID5 | 4 | −1 |
| ID7 ≦ I < ID6 | 2 | −1 |
| ID8 ≦ I < ID7 | 1 | −1 |
| I < ID8 | 0 | −1 or −2 |

OVERCURRENT PROTECTION CIRCUIT

CROSS REFERENCE TO RELATED APPLICATIONS

The present application is based on and claims priority to Japanese Patent Applications No. 2011-200577 filed on Sep. 14, 2011, No. 2011-212586 filed on Sep. 28, 2011, and No. 2012-113681 filed on May 17, 2012, the contents of which are incorporated in their entirety herein by reference.

TECHNICAL FIELD

The present disclosure relates to an overcurrent protection circuit.

BACKGROUND

JP-A-2010-279158 discloses a circuit protection device that detects a current value of electric current supplied to a load (load current value) with current detection means and detects an overcurrent based on the detected load current value. In the circuit protection device, the detected load current value is compared in parallel with a plurality of comparators. Then, an addition value corresponding to the largest threshold value that is determined to exceed a threshold value by the comparators is added. When, a result of addition exceeds a predetermined determination value, the current protection device detects an overcurrent and interrupts current application to the load.

In general, it is desirable to bring a current interruption characteristic close to a deterioration characteristic of a wire to decrease a line diameter of the wire. In the circuit protection device, the comparators corresponding to the number of the threshold values of the electric current are provided. Thus, in order to bring the current interruption characteristic close to the deterioration characteristic of the wire, the number of comparators may increase, and a configuration of a circuit may be complicated. An on-off state of the current application to the load is controlled with a semiconductor switch. However, a current characteristic may change with a temperature of the semiconductor switch. The above-described circuit protection device cannot perform a temperature correction in accordance with a change in the current characteristic. Thus, the above-described circuit protection device cannot detect an overcurrent with a high accuracy.

JP-A-2009-142146 discloses a power supply device that calculates a square current value of a detection value proportional to an electric current supplied to a semiconductor switch coupled with an electric wire, compares a temperature increase corresponding value obtained from the square current value and an abnormality determination value, and turns off the semiconductor switch when the temperature increase corresponding value is greater than the abnormality determination value.

In the power supply device, a transitional thermal change of a heat flow rate corresponding to a thermal change in the semiconductor switch can be expressed by a logical expression, and the logical expression can be calculated by digital computing.

However, in the power supply device, in order to actualize the thermal change in accordance with the predetermined logical expression with a digital circuit, the digital circuit and a peripheral circuit are required. Thus, a circuit for protecting the semiconductor switch may be complicated.

SUMMARY

It is an object of the present disclosure to provide an overcurrent protection circuit that can detect an overcurrent with a high degree of accuracy with a simple circuit configuration. It is another object of the present disclosure to provide an overcurrent protection circuit that can determine a plurality of current levels with one comparator.

An overcurrent protection circuit according to a first aspect of the present disclosure includes a load drive section, a wire, a current detection section, an addition and subtraction section, a comparison circuit, and a control section. The load drive section drives a load. The wire is coupled with the load and the load drive section. The current detection section detects a load current value of an electric current that flows to the load. The current detection section includes an AD converter and a current value calculation circuit. The AD converter receives a detection signal corresponding to the load current value and analog-to-digital converting the detection signal. The current value calculation circuit calculates the load current value from the detection signal converted by the AD converter. The addition and subtraction section determines an addition and subtraction value based on the load current value detected by the current detection section, stores an integration result of addition and subtraction using the addition and subtraction value, and transmits the integration result. The addition and subtraction section includes an addition value determination circuit. The addition value determination circuit determines an addition value in the addition and subtraction value based on the load current value calculated by the current value calculation circuit and a function expression or information indicating a relationship between the load current value and the addition value. The comparison circuit compares the integration result transmitted from the addition and subtraction section with a threshold value and transmits a signal indicating an overcurrent detection result. The control circuit controls the load drive section based on the signal indicating the overcurrent detection result transmitted from the comparison circuit to limit the electric current that flows to the load and the wire and to protect a protection object from an overcurrent.

The overcurrent protection circuit according to the second aspect can detect an overcurrent with a high degree of accuracy with a simple circuit configuration and can determine a plurality of current levels with one comparator.

An overcurrent protection circuit according to a second aspect of the present disclosure includes a load drive section, a current detection section, and a control section. The load drive section drives a plurality of loads. The current detection section detects an electric current flowing to each of the loads and transmits a current detection value corresponding to the electric current. The control section includes an overcurrent level determination section and an addition and subtraction section. The control section turns on and off the load drive section based on an input condition. The overcurrent level determination section determines an overcurrent level of the current detection value. The addition and subtraction section adds and subtracts predetermined values corresponding to the current detection value based on a determination result of the overcurrent level determination section. The addition and subtraction section adds and subtracts the predetermined values corresponding to the current detection value at the present time with respect to a calculation result using predetermined values corresponding to the current detection value at the last time. The control section controls the load drive section to limit the electric current flowing to a corresponding one of the loads when a calculation result of the addition and subtraction section is greater than a determination threshold value. The current detection section includes a comparison circuit, a channel switching circuit, and a threshold switching circuit. The comparison circuit includes a comparator transmitting the current detection value. Output terminals respectively coupled with the loads are regarded as channels. The channel switching circuit selects one of the channels and transmits a voltage corresponding to the electric current flowing to a selected channel to the comparator. The threshold switching circuit sets a plurality of threshold values for each of the channels. The threshold switching circuit transmits the threshold values of the selected channel in turn to the comparator.

The overcurrent protection circuit according to the second aspect can detect an overcurrent with a high degree of accuracy with a simple circuit configuration and can determine a plurality of current levels with one comparator.

BRIEF DESCRIPTION OF THE DRAWINGS

Additional objects and advantages of the present disclosure will be more readily apparent from the following detailed description when taken together with the accompanying drawings. In the drawings:

FIG. 6A is a diagram showing a relationship between load current values and addition values of a first line type, and FIG. 6B is a diagram showing information about a relationship between load current values and addition values of a second line type;

FIG. 11 is a diagram showing a relationship between detection current ranges, additional values, and subtraction values according to the fifth embodiment;

FIG. 16 is a diagram showing a relationship between detection current ranges, additional values, and subtraction values according to the sixth embodiment.

DETAILED DESCRIPTION

Some of the inventors filed Japanese Patent Application No. 2010-469676 about an overcurrent protection circuit in which an addition and subtraction circuit adds a predetermined value depending on a detection current value acquired at the present time to a calculation result using a predetermined value depending on a detection current value acquired at the last time, and a semiconductor switch is turned off when a calculation result of the addition and subtraction circuit is greater than a threshold value.

In the overcurrent protection circuit, an overcurrent level is divided into 9 levels, and 8 comparators are provided for determining the overcurrent level. Thus, the number of comparators increases, a size of a circuit increases, and a cost increases.

The following describes overcurrent protection circuits according to embodiments of the present disclosure.

First Embodiment

An overcurrent protection circuit 1 according to a first embodiment of the present disclosure will be described. In the present embodiment, an example in which a wire (wire harness) is a protection object and a damage of the wire due to an overcurrent will be described.

The overcurrent protection circuit 1 according to the present embodiment may be equipped in a vehicle and may operate as a power supply device that supplies electric power to a load coupled with a wire. The overcurrent protection circuit 1 detects an overcurrent flowing to the wire to protect the load.

Figure 1:
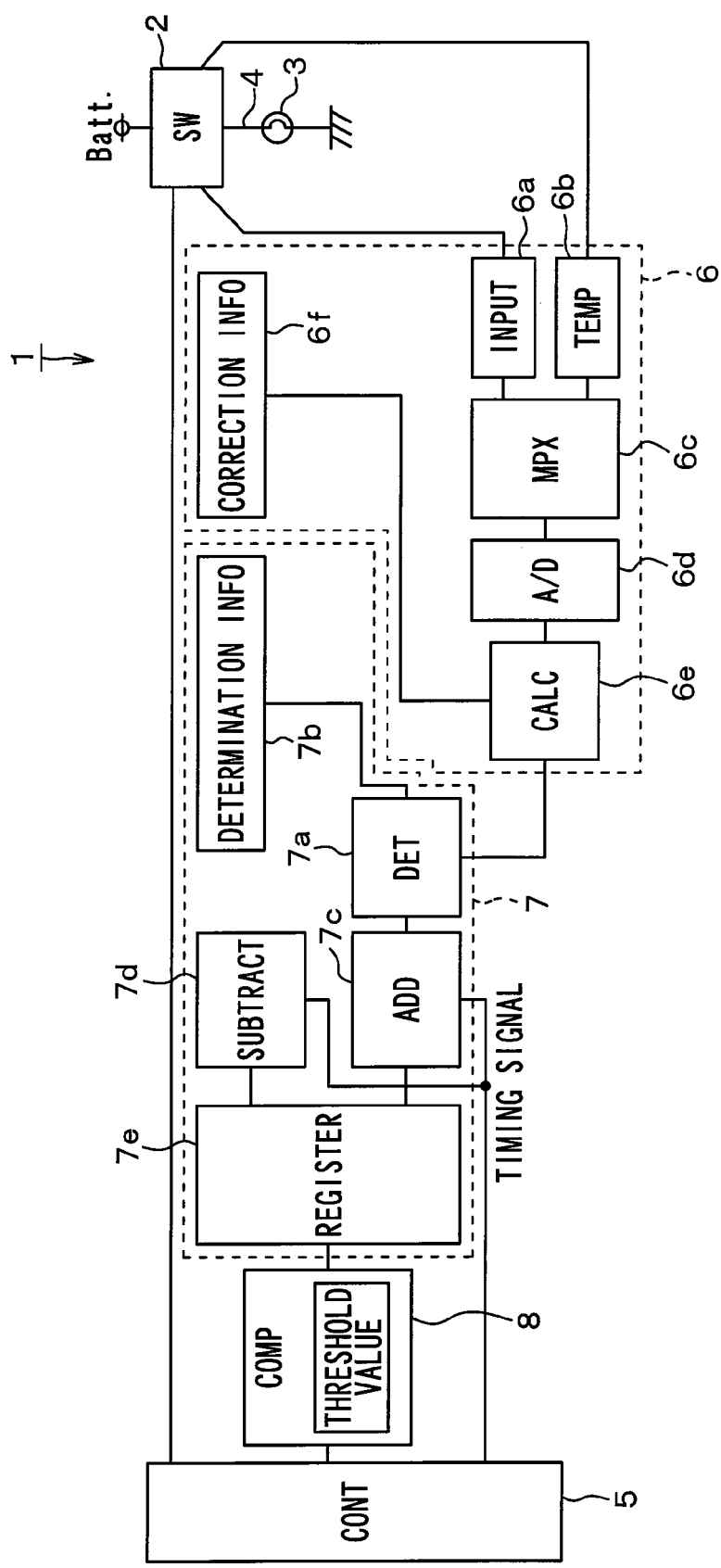
FIG. 1 is a block diagram showing an overcurrent protection circuit according to a first embodiment of the present disclosure.

As shown in FIG. 1, the overcurrent protection circuit 1 controls a semiconductor switch (SW) 2, thereby controlling a current supply from a power source Batt to a load 3 and driving the load 3. In addition, the overcurrent protection circuit 1 detects that an electric current supplied to the load 3 becomes an overcurrent and controls the semiconductor switch 2 so as to stop or reduce the electric current supplied to the load 3. Accordingly, the overcurrent protection circuit 1 protects the wire 4, via which the electric current is supplied to the load 3, from the overcurrent. The overcurrent protection circuit 1 includes a control circuit (CONT) 5, a current detection section 6, an addition and subtraction section 7, and a comparison circuit (COMP) 8.

Figure 2:
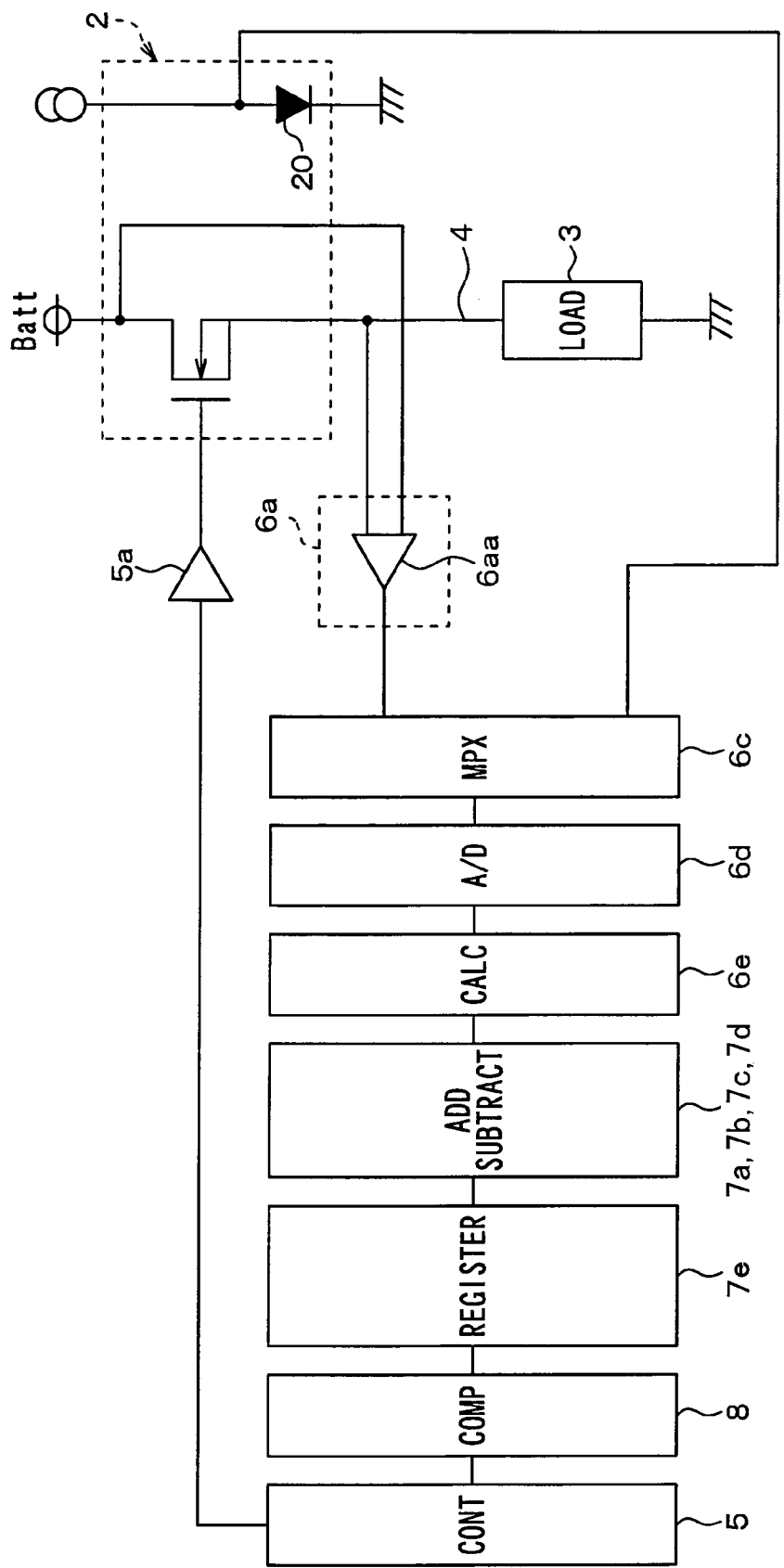
FIG. 2 is a diagram showing a part of the overcurrent protection circuit shown in FIG. 1.

The semiconductor switch 2 may be provided as a load drive section. As shown in FIG. 1, the semiconductor switch 2 includes a semiconductor switching element coupled to a high side of the load 3. The semiconductor switching element may be a power metal-oxide semiconductor field-effect transistor (power MOSFET), an insulated gate bipolar transistor (IGBT), and a bipolar transistor. For example, in a case where an n-type MOSFET is used as the semiconductor switch 2, as shown in FIG. 2, a drain of the semiconductor switch 2 is coupled with the power source Batt, a source of the semiconductor switch 2 is coupled with the load 3, and a gate of the semiconductor switch 2 is coupled with the control circuit 5 via an input buffer 5a. The current detection section 6 receives a signal corresponding to the electric current supplied to the load 3 via the semiconductor switch 2. For example, an electric current IDS between the drain and the source of the power MOSFET, or a voltage VDS between the drain and the source (hereafter, referred to as the drain-source voltage VDS) corresponding to the electric current IDS may be the detection signal. The semiconductor switch 2 may include a sensing element or a shunt resistor so that the detection signal is transmitted to the current detection section 6. In a case where the semiconductor switch 2 includes a sensing element, a sensing current that flows from the sensing element, that is, an electric current attenuated from the electric current supplied to the load 3 at a predetermined ratio becomes the detection signal. In a case where a shunt resistor is coupled to a low side of the semiconductor switch 2, a voltage between both ends of the shunt resistor or a high side voltage becomes the detection signal.

The control circuit 5 controls the semiconductor switch 2 to control the current supply from the power source Batt to the load 3. For example, in the case where the semiconductor switch 2 includes the n-type power MOSFET, the control circuit 5 controls the semiconductor switch 2 by controlling the gate voltage of the n-type power MOSFET. The control circuit 5 detects an overcurrent based on a comparison result of the comparison circuit 8. When the control circuit 5 detects that an overcurrent flows, the control circuit 5 controls the gate voltage to control the semiconductor switch 2 and stops or reduces the electric current supplied to the load 3. Accordingly, the overcurrent protection circuit 1 restricts a damage of the wire 4 due to the overcurrent.

The current detection section 6 calculates a current value (load current value) of the electric current that flows to the wire 4 coupled with the load 3. In the present embodiment, the current detection section 6 calculates not only the load current value but also a corrected load current value. The current detection section 6 calculates the corrected load current value by multiplying the load current value by a temperature correction value based on temperature information of the semiconductor switch 2. The current detection section 6 includes a detection signal input circuit (INPUT) 6a, a temperature detection circuit (TEMP) 6b, a multiplexer (MPX), an AD converter (A/D) 6d, a current value calculation circuit (CALC) 6e, and a current correction information storing portion (CORRECTION INFO) 6f.

The detection signal input circuit 6a receives the detection signal from the semiconductor switch 2. In the present embodiment, the detection signal input circuit 6a includes a VDS detection circuit that detects the drain-source voltage VDS. In the present embodiment, it is assumed that the n-type power MOSFET is used as the semiconductor switch 2. For example, the detection signal input circuit 6a includes an amplifier 6aa as shown in FIG. 2. The detection signal input circuit 6a receives the drain-source voltage VDS corresponding to the electric current IDS between the drain and the source as the detection signal and amplifies the detection signal, for example, on the basis of the ground and transmits the amplified detection signal to the multiplexer 6c.

The temperature detection circuit 6b transmits a temperature detection signal in accordance with a temperature of the semiconductor switch 2. For example, the semiconductor switch 2 includes a temperature characteristic circuit that includes a diode 20 as shown in FIG. 2. Actually, the temperature characteristic circuit includes multiple stages of diodes. A high-side potential of the temperature characteristic circuit changes with the temperature of the semiconductor switch 2 due to temperature characteristics of the diode 20. Thus, the temperature detection circuit 6b detects the high-side potential as the temperature detection signal and transmits the temperature detection signal to the multiplexer 6c.

The multiplexer 6c selects the signal transmitted from the detection signal input circuit 6a or the signal of the temperature detection circuit 6b and transmits a selected signal to the AD converter 6d. For example, the multiplexer 6c selects the signal based on a switching signal from the control circuit 5. For example, the AD converter 6d receives the signal from the detection signal input circuit 6a and the signal from the temperature detection circuit 6b alternately with a predetermined sampling period by time division control.

The AD converter 6d converts analog values of the drain-source voltage VDS and the temperature detection signal to digital signals and transmits the digital signals to the current value calculation circuit 6e.

The current value calculation circuit 6e calculates a load current value I supplied to the load 3 via the semiconductor switch 2. The current value calculation circuit 6e calculates the load current value I from an on-resistance Ro of the semiconductor switch 2 and the digital value converted from the drain-source voltage VDS transmitted from the detection signal input circuit 6a and transmits a calculation result to the addition and subtraction section 7. The current value calculation circuit 6e calculates the load current value I basically from following Equation 1.

$$I=VDS/Ron \qquad \text{[Equation 1]}$$

In the present embodiment, the current value calculation circuit 6e performs a temperature correction of the on-resistance Ron based on memory contents of the current correction information storing portion 6f. Then, the current value calculation circuit 6e calculates the load current value I by substituting the on-resistance Ron after correction to Equation 1.

Figures 3, 4:
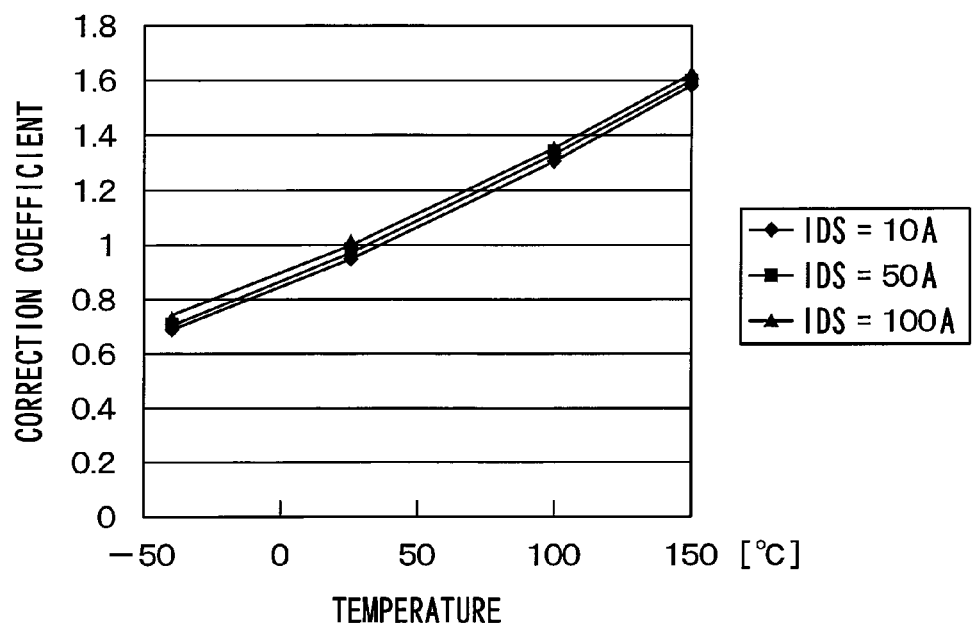
FIG. 3 is a diagram showing a relationship between temperatures of a sensor switch and correction coefficients.
FIG. 4 is a diagram showing a relationship between load current values and addition values.

The current correction information storing portion 6f stores current correction information of the semiconductor switch 2. Specifically, the current correction information storing portion 6f stores data for the temperature correction of the on-resistance Ron by the current value calculation circuit 6e. For example, a map indicating a relationship between the temperature of the semiconductor switch 2 and a correction coefficient of the on-resistance Ron is stored. FIG. 3 is a diagram showing an example of the map indicating the relationship between the temperature of the semiconductor switch 2 and the correction coefficient of the on-resistance Ron. As shown in FIG. 3, the correction coefficient increases with increase in the temperature of the semiconductor switch 2. For example, the on-resistance Ron at a temperature T can be calculated by multiplying a correction coefficient α1 by the temperature T of the semiconductor switch 2 and adding a constant A. In other words, the on-resistance Ron can be calculated using Equation 2. As is known from Equation 2, the on-resistance Ron can be substantially linearly approximated with respect to the temperature. The correction coefficient α1 and the constant A may be changed based on the temperature. For example, the correction coefficient α1 and the constant A may be changed between a case where the temperature is 25° C. or higher and a case where the temperature is lower than 25° C. When the calculation formula is changed based on the temperature, the on-resistance is not completely linear with respect to the on-resistance Ron. Thus, the on-resistance Ron can be calculated with higher accuracy.

$$Ron=\alpha 1 \times T+A \qquad \text{[Equation 2]}$$

The relationship between the temperature of the semiconductor switch 2 and the correction coefficient of the on-resistance Ron slightly changes with the drain-source current IDS, however, has a characteristic similar to the relationship shown in FIG. 3. Thus, the map may be stored for each current IDS or a representative map may be stored. The on-resistance Ron can be easily calculated based on the detection result of the temperature detection circuit 6b by previously examining a temperature of an element included in the semiconductor switch 2 and the on-resistance Ron. When the calculation formula is changed in accordance with the drain-source current IDS in view of a current dependency, a high degree of accuracy can be obtained. For example, when the on-resistance Ron is calculated while assuming that the current IDS is 10 A and a calculation result does not correspond to a case where the current IDS is 10 A but corresponds to a case where the current IDS is 50 A, the on-resistance Ron may be corrected and a re-calculation may be performed.

As described above, when the current value calculation circuit 6e calculates the load current value I by substituting the digital converted value of the temperature detection signal detected by the temperature detection circuit 6b and the on-resistance treated with the temperature correction, the overcurrent protection circuit 1 detects an overcurrent with a high degree of accuracy because a temperature change is taken into consideration.

The addition and subtraction section 7 adds and subtracts a predetermined value based on the calculation result of the current detection section 6. The addition and subtraction section 7 performs calculation in accordance with the load current I detected by the current detection section 6, that is, an overcurrent level. The addition and subtraction section 7 may perform addition and subtraction with software by a microcomputer, or the addition and subtraction section 7 may perform addition and subtraction with a digital circuit of hardware. The addition and subtraction section 7 includes an addition value determination circuit (DET) 7a, a current determination information storing portion (DETERMINATION INFO) 7b, an addition circuit (ADD) 7c, and a subtraction circuit (SUBTRACT) 7d, and an integration register (REGISTER) 7e.

In FIG. 2, the addition value determination circuit 7a, the current determination information storing portion 7b, the addition circuit 7c, and the subtraction circuit 7d are denoted by ADD SUBTRACT as a whole. The addition value determination circuit 7a, the current determination information storing portion 7b, the addition circuit 7c, and the subtraction circuit 7d may be provided as one circuit, or the addition value determination circuit 7a, the current determination information storing portion 7b, the addition circuit 7c, and the subtraction circuit 7d, and the integration register 7e may be provided as one circuit.

The addition value determination circuit 7a determines an addition value used for addition as the predetermined value corresponding to the digitalized load current value I, and transmits the addition value to the addition circuit 7c. The addition value determination circuit 7a basically determines the addition value to a value proportional to the square of the load current value I, that is, a value proportional to a heating value of Joule's heat. The addition value may decrease a proportionality coefficient with increase in integration value to increase accuracy. However, because a capacity of a memory that stores the integration value increases as it is, only top 10 bit of the square of the load current value I may be used for determining the addition value, and the addition value may be transmitted to the addition circuit 7c.

The addition value determination circuit 7a may also determine the addition value corresponding to the load current value I based on data stored in the current determination information storing portion 7b.

The current determination information storing portion 7b stores information about a relationship between the load current value I and the addition value. The addition value determination circuit 7a uses the information stored in the current determination information storing portion 7b. The addition value determination circuit 7a reads the addition value corresponding to the detected load current value I and determines the addition value.

FIG. 4 is a diagram showing an example of a relationship between the load current value I and the addition value. As shown in FIG. 3, a plurality of detection current range $I_1$, $I_2$, $I_3$, $I_4$, $I_5$ ... ($I_1 > I_2 > I_3 > I_4 > I_5$ ...) is set for the load current value I. Then, 10 times the square value of the detection current lower limits of the respective detection current ranges (e.g., when the detection current value>the square value of $I_1$; when $I_1$>the detection current value>$I_2$, the square value of $I_2$) are set as the addition values $A_1$, $A_2$, $A_3$, $A_4$, $A_5$ .... Although it is not shown in FIG. 4, when the load current value I is less than a predetermined current value, the addition value is set to zero. By storing the information about the relationship between the load current value I and the addition value in the current determination information storing portion 7b, the addition value corresponding to the load current value I can be calculated from the information. Even in a case where the addition value is calculated based on the information about the relationship between the load current value I and the addition value, the addition value can be calculated based on the digitalized load current value I. Thus, the addition value can be calculated with a high degree of accuracy.

The current determination information storing portion 7b stores data such as a table. In the present embodiment, because only an electric current supplied to the wire 4 coupled with one load 3 is detected, the current determination information storing portion 7b needs to store only one table. When the number of wires 4 to be detected increases, the amount of data to be stored increases in accordance with wire characteristics. Thus, in the case where the addition value determination circuit 7a determines the addition value by simply calculating the value proportional to the square of the load current value I, a memory capacity can be reduced.

The addition circuit 7c adds the addition value determined by the addition value determination circuit 7a to an integration result at the last sampling period to calculate an integration result at the present sampling period. For example, in the above-described example, when the load current value I is less than or equal to the predetermined value, the addition value is set to 0. Thus, when the load current value I is greater than the predetermined current value, the addition value is added. The addition circuit 7c receives a timing signal from the control circuit 5. Based on the timing signal, the addition circuit 7c adds the addition value to the integration result at the last sampling period with respect to each sampling period.

The subtraction circuit 7d subtracts a predetermined subtraction value from the integration result of the last sampling period to calculate an integration result of the present sampling period. The subtraction circuit 7d receives a timing signal from the control circuit 5. Based on the timing signal, the subtraction circuit 7d subtracts the subtraction value from the integration result at the last sampling period with respect to each sampling period.

The subtraction value may be a fixed value when the load current value I is less than or equal to the predetermined current value. The subtraction value may also be reduced with decrease in the integration value to increase the accuracy. The subtraction value may also be a predetermined value depending on the load current value I, or the subtraction value may be a fixed value independent from the load current value I. The subtraction value may also be increased with increase in a difference between the temperature of the semiconductor switch 2 and the environmental temperature based on a relationship between the wire 4 and the environmental temperature. In the case where the subtraction value is set to the fixed value when the load current value I is less than or equal to the predetermined current value, the subtraction value is subtracted when the load current I is less than or equal to the predetermined current value.

The integration register 7e stores the integration result at the last sampling period. The integration register 7e transmits the integration result at the present sampling period calculated by the addition circuit 7c and the subtraction circuit 7d to the comparison circuit 8. Furthermore, the integration register 7e renews the integration result at the last sampling period with the integration result at the present sampling period. In other words, each of the addition circuit 7c and the subtraction circuit 7d performs the addition or the subtraction using the integration result at the sampling period stored in the integration register 7e and stores the integration result at the present sampling period, which is obtained by the addition or the subtraction, in the integration register 7e.

In the above-described example, the addition circuit 7c adds the addition value when the load current value I is greater than the predetermined current value, and the subtraction circuit 7d subtracts the subtraction value when the load current value I is less than or equal to the predetermined current value. In other words, only one of the addition and the subtraction is performed with respect to each sampling period. In a case where both the addition value and the subtraction value are set in accordance with the load current value I and both the addition and the subtraction are performed with respect to the same sampling period, the integration result by the addition circuit 7c and the subtraction circuit 7d is stored in the integration register 7e. The predetermined current value may be, for example, a wire allowable current value or a wire smoking current value. The wire allowable current value is the maximum current value that is capable of steadily flowing to the wire 4 without deteriorating the wire 4.

The comparison circuit 8 may be, for example, a digital comparator. The comparison circuit 8 compares the integration result transmitted from the integration register 7e and a first determination threshold value. When the integration result is greater than the first determination threshold value, the comparison circuit 8 transmits a signal indicating that an overcurrent flows to the control circuit 5. In the comparison circuit 8, a predetermined comparison value determined for each type of the wire 4 is stored. The comparison circuit 8 uses the comparison value as the first determination threshold value. Based on the comparison result of the comparison circuit 8, the control circuit 5 detects an overcurrent. When the control circuit 5 detects an overcurrent, the control circuit 5 controls the semiconductor switch 2 by controlling the gate voltage, thereby stopping or reducing the electric current supplied to the load 3. Accordingly, the overcurrent protection circuit 1 can protect the wire 4 to supply the electric current to the load 3 from an overcurrent and restrict a damage of the wire 4.

Furthermore, the comparison circuit 8 compares the integration result transmitted from the integration register 7e with a second determination threshold value that is smaller than the first determination threshold value. When the integration result becomes less than or equal to the second determination threshold value after the electric current supplied to the load 3 is limited, the comparison circuit 8 transmits a signal to the control circuit 5 to turn on the semiconductor switch 2. Accordingly, when an overcurrent stops flowing to the wire 4 and a possibility of a damage of the wire 4 is reduced, the load 3 is driven again. Thus, even if the semiconductor switch 2 is turned off, the semiconductor switch 2 is tuned on after a predetermined time, and the load 3, which is interrupted once, can be driven again.

As described above, in the overcurrent protection circuit 1 according to the present embodiment, the drain-source voltage VDS corresponding to the load current value I supplied to the load 3 is converted into digital values by the AD converter 6d. The load current value I is calculated from the value digitalized by the AD converter 6d. The addition value corresponding to the load current value I is calculated using the function expression or the information about the relationship between the load current value I and the addition value. When the addition value is added and the integration value becomes greater than the predetermined threshold value, the electric current supplied to the load 3 is limited. In addition, when the load current value I is less than or equal to the predetermined current value, the subtraction value is subtracted. Then, when the integration value becomes greater than the first determination threshold value, the overcurrent protection circuit 1 detects that an overcurrent flows.

In the overcurrent protection circuit 1, the addition value determination circuit 7a determines the addition value in accordance with the load current value I, and the addition value is added to the integration result. Furthermore, when the load current value I is less than or equal to the predetermined current value, the predetermined subtraction value is subtracted from the integration result. Thus, the addition value corresponding to the load current value I can be set with a high degree of accuracy without using a plurality of comparators, and an overcurrent protection can be performed with a higher degree of accuracy. In addition, because the digitalized load current value I and the temperature detection signal are used, the temperature correction of the load current value I can be easily performed. Accordingly, the temperature correction can be performed appropriately, and the overcurrent protection can be performed with a higher degree of accuracy.

Second Embodiment

An overcurrent protection circuit 1 according to a second embodiment of the present disclosure will be described. In the present embodiment, the overcurrent protection circuit according to the first embodiment is modified to deal with a plurality of channels. Because others are similar to the first embodiment, only a part different from the first embodiment will be described.

Figure 5:
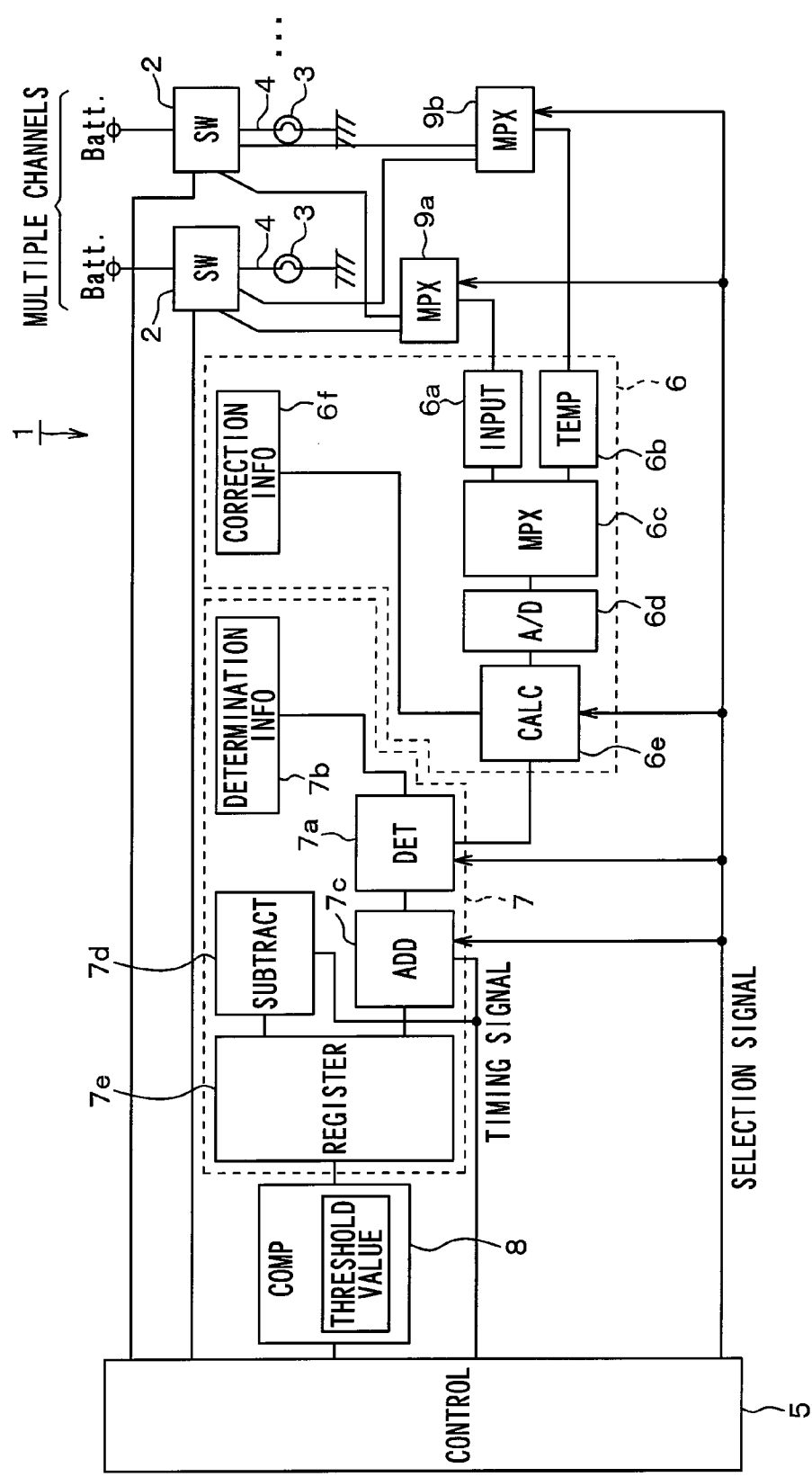
FIG. 5 is a block diagram showing an overcurrent protection circuit according to a second embodiment of the present disclosure.

As shown in FIG. 5, the overcurrent protection circuit 1 according to the present embodiment controls a plurality of semiconductor switches 2 to drive a plurality of loads 3. The control circuit 5 controls each of the semiconductor switches 2. Each component in the overcurrent protection circuit 1 is shared by wires 4 to supply the electric current to the loads 3.

A detection signal from each of the semiconductor switches 2 is transmitted to a multiplexer 9a. In addition, a temperature detection signal of each of the semiconductor switches 2 is transmitted to a multiplexer 9b. Each of the wires 4 to supply the electric current to the loads 3 is regarded as one channel. Each of the multiplexers 9a, 9b selects an input signal of the channel to be an overcurrent detection object, and the selected input signal is transmitted from the multiplexer 9a, 9b to the detection signal input circuit 6a and the temperature detection circuit 6b. The control circuit 5 transmits selection signals to the multiplexers 9a, 9b, the current value calculation circuit 6e, the addition value determination circuit 7a, the addition circuit 7c, and the like. Based on the selection signals, each component determines the channel to be the overcurrent protection object.

Also in the present embodiment, the addition value determination circuit 7a determines the addition value by simply calculating the value proportional to the square of the load current value I. The addition value determination circuit 7a may also calculate the addition value while decreasing a proportionality coefficient with increase in the integration value to increase accuracy. In this way, the addition value determination circuit 7a determines the addition value based on the load current value I. The current determination information storing portion 7b may store information about a relationship between the load current value I and the addition value for each line type. FIG. 6A and FIG. 6B are diagrams respectively showing information about the relationship between the load current value I and the addition value for a first line type and a second line type. As shown in FIG. 6A and FIG. 6B, a plurality of detection current ranges $I_1, I_2, I_3, I_4, I_5 \ldots$ ($I_1 > I_2 > I_3 > I_4 > I_5 \ldots$) is set for the load current value I. Then, 10 times the square value of the detection current lower limits of the respective detection current ranges (e.g., when the detection current value$>I_1$, the square value of $I_1$; when the detection current value$>I_2$, the square value of $I_2$) are set as the addition values $A_1, A_2, A_3, A_4, A_5 \ldots$.

The overcurrent protection circuit 1 having the above-described configuration protects the wire 4 of each channel from an overcurrent by performing an overcurrent detection while switching channels to be the overcurrent detection object.

The overcurrent protection circuit 1 switches the channels to be the overcurrent protection object with a predetermined control period. In addition, the overcurrent protection circuit 1 switches the signal selected at the multiplexer 6c with a sampling period that is shorter than the control period. Accordingly, the voltage VDS and the temperature detection signal of each channel is transmitted to the AD converter 6d in turn. The current value calculation circuit 6e determines the channel of the overcurrent detection object based on the selection signal transmitted from the control circuit 5, and the current value calculation circuit 6e calculates the load current value I corresponding to the channel. For example, when the temperature correction of the on-resistance Ron is performed, the information corresponding to the channel is read from the current correction information storing portion 6f and the temperature correction is performed based on the on-resistance Ron.

After the load current value I of the channel of the overcurrent detection object is calculated, the addition value determination circuit 7a determines the addition value. Also in this time, the addition value is determined based on the digitalized load current value I. The addition value determination circuit 7a may simply set the addition value to the value proportional to the square of the load current value I. The addition value may decrease a proportionality coefficient with increase in the integration value to increase accuracy. The addition value determination circuit 7a may also read the information of the relationship between the load current value I and the addition value for the channel of the overcurrent detection object from the current determination information storing portion 7b and determine the addition value based on the information.

The addition circuit 7c adds the addition value determined by the addition value determination circuit 7a to the integration result stored in the integration register 7e. Similarly, the subtraction circuit 7d subtracts the predetermine subtraction value from the integration result stored in the integration register 7e. The integration register 7e stores the integration result of each channel. The addition circuit 7c and the subtraction circuit 7d perform the addition and the subtraction with respect to the integration result of the channel that is the overcurrent detection object. The integration result is transmitted to the comparison circuit 8. The comparison circuit 8 compares the integration result with the first determination threshold value and the second determination threshold value and detects an overcurrent. Because the control circuit 5 understands which channel is the overcurrent detection object, when an overcurrent is detected, the control circuit 5 controls the semiconductor switch 2 of the overcurrent detection object to limit the current supply to the load 3.

The overcurrent protection circuit 1 according to the present embodiment includes multiplexers 9a, 9b in addition to the components of the overcurrent protection circuit 1 according to the first embodiment, and the control circuit 5 transmits the selection signal that indicates that channel being the overcurrent detection object. Accordingly, the overcurrent protection circuit 1 can achieve the overcurrent protection of the wires 4 of the plurality of channels.

Third Embodiment

In the present embodiment, a configuration of a detection signal input circuit is changed from the first embodiment. Because others are similar to the first embodiment, only a part different from the first embodiment will be described.

Figure 7:
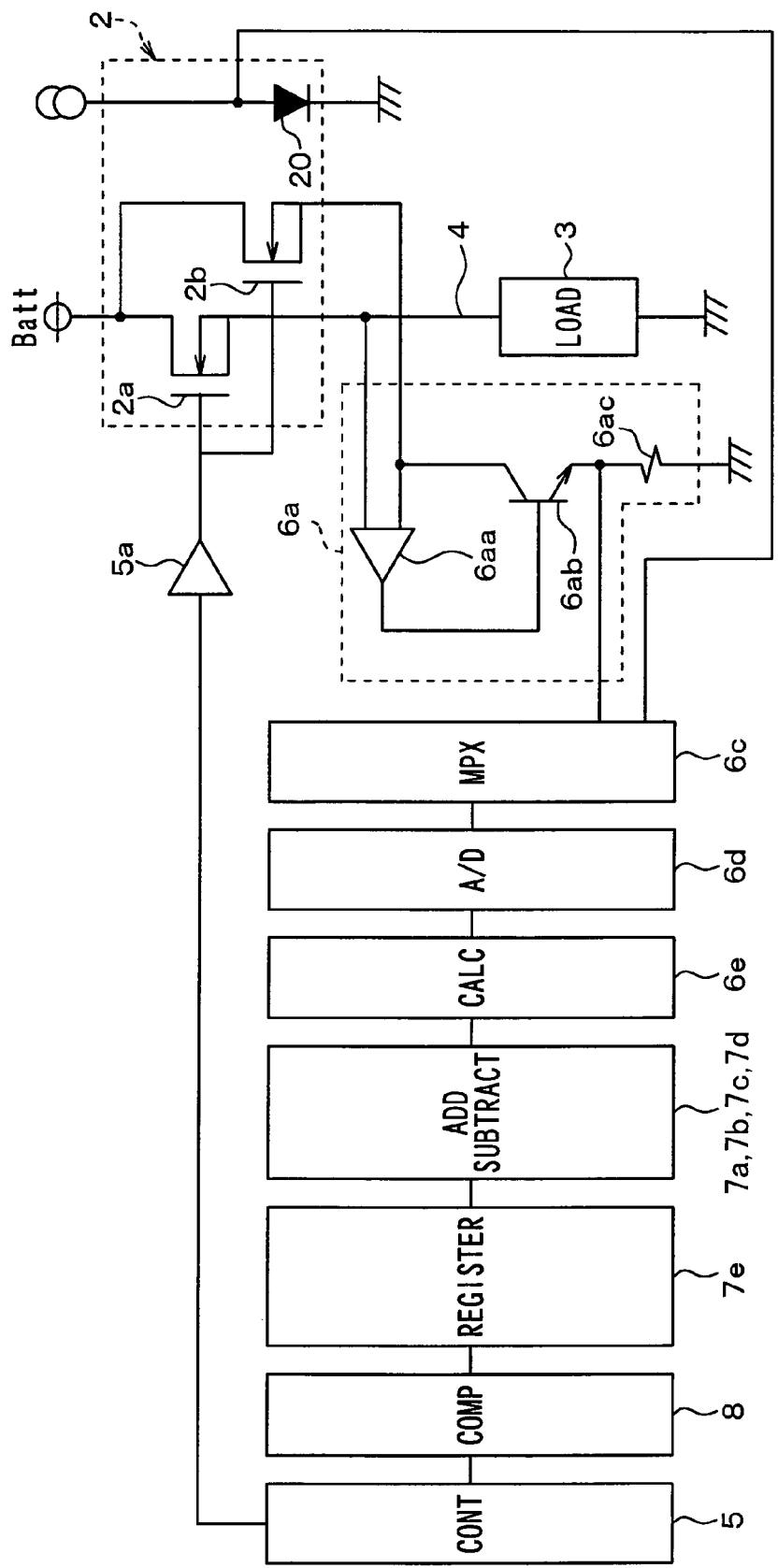
FIG. 7 is a block diagram showing an overcurrent protection circuit according to a third embodiment of the present disclosure.

As shown in FIG. 7, the overcurrent protection circuit 1 according to the present embodiment includes a detection signal input circuit with a sensing element. For example, in a case where the semiconductor switch 2 is an n-type power MOSFET, the power MOSFET includes a main MOSFET 2a and a sensing MOSFET 2b. The sensing MOSFET 2b is a sensing element in which a sensing current attenuated from a drain-source current IDS of the main MOSFET 2a at a predetermined ratio.

The detection signal input circuit 6a includes an amplifier 6aa, an NPN transistor 6ab, and a resistor 6ac. Source potentials of the main MOSFET 2a and the sensing MOSFET 2b are input to the amplifier 6aa. A high-side potential of the resistor 6ac is input to the multiplexer 6c. The amplifier 6aa amplifies a potential difference between the source potentials of the main MOSFET 2a and the sensing MOSFET 2b to change a base voltage of the NPN transistor 6ab. Accordingly, a corrector current of the NPN transistor 6ab changes and a high-side potential of the resistor 6ac changes. By inputting the high-side potential of the resistor 6ac to the multiplexer 6c, the addition value and the subtraction value can be determined using the drain-source current IDS of the power MOSFET.

In this way, the detection signal input circuit 6a may receive the detection signal using the sensing element.

Fourth Embodiment

An overcurrent protection circuit 1 according to a fourth embodiment of the present disclosure will be described. In the present embodiment, a method of addition and subtraction in the addition and subtraction circuit 7 is changed from the first embodiment. Because others are similar to the first embodiment, only a part different from the first embodiment will be described.

Figure 8:
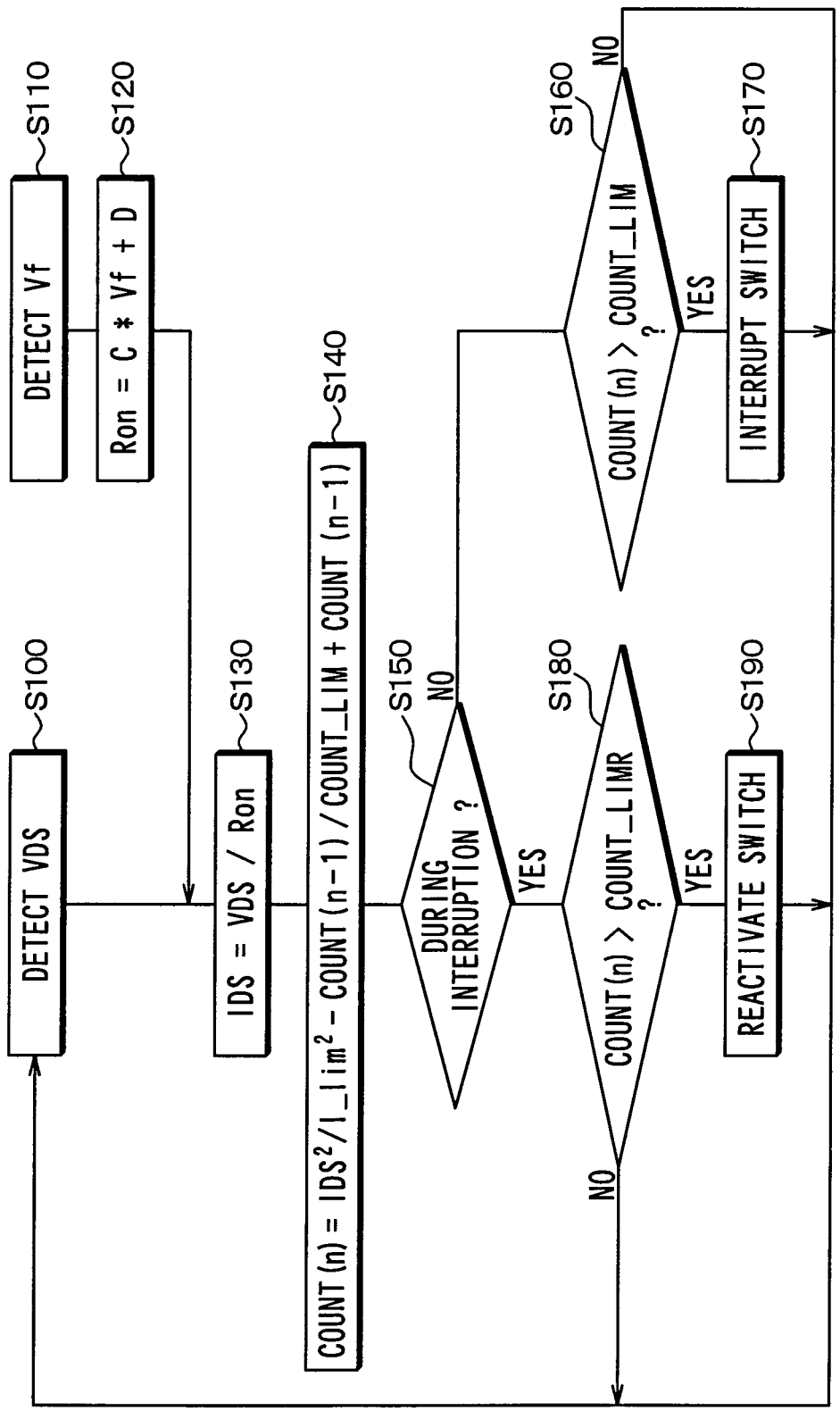
FIG. 8 is a flowchart showing an addition subtraction process performed by an overcurrent protection circuit according to a fourth embodiment of the present disclosure.

FIG. 8 is a flowchart showing an addition subtraction process performed by the overcurrent protection circuit according to the present embodiment. In the present embodiment, the addition subtraction process is performed with a predetermined control period on the assumption that components in the addition and subtraction circuit 7 are put together in one circuit.

At S100, the drain-source voltage VDS is detected via the detection signal input circuit 6a. At S110, a forward voltage Vf of the diode 20 in the semiconductor switch 2 is detected via the temperature detection circuit 6b. At S120, the on-resistance Ron is calculated by substituting the forward voltage Vf in a predetermined function expression. For example, the on-resistance Ron can be calculated using following Equation 3. In Equation 3, C is a coefficient and D is a constant, which are predetermined.

$$Ron = C \times Vf + D \qquad \text{[Equation 3]}$$

The on-resistance Ron is substantially proportional to the forward voltage Vf. Thus, the on-resistance Ron can be calculated by approximating to a linear function as Equation 3. Actually, the on-resistance Ron is a square expression of the forward voltage Vf. Thus, the on-resistance may also be calculated using a function expression for calculating a value proportional to the square of the forward voltage Vf.

The processes at S100, S110, S120 are performed in turn based on a signal switching by the multiplexer 6c.

At S130, the drain-source current IDS is calculated. The drain-source current IDS is calculated by dividing the drain-source voltage VDS by the on-resistance Ron as Equation 4.

$$IDS = VDS/Ron \qquad \text{[Equation 4]}$$

At S140, the integration value COUNT(n) at the present period is calculated. The integration value COUNT(n) is calculated by adding an additional and subtraction value to the integration value COUNT(n−1) at the last period. The addition subtraction value is the sum of an additional item of the addition value and a subtraction item of the subtraction value. For example, the addition subtraction value can be calculated by following Equation 5.

$$COUNT(n) = IDS^2/I\_lim^2 - COUNT(n-1)/COUN\text{-}$$
$$T\_LIM + COUNT(n-1) \qquad \text{[Equation 5]}$$

As shown in Equation 5, the addition item is proportional to the square of the drain-source current IDS corresponding to the load current I is inversely proportional to the square of the maximum current I_lim that is capable of steadily flowing in the wire 4 as the overcurrent protection circuit without deteriorating the wire 4. The square of the drain-source current IDS corresponds to the heating value of the wire 4. Thus, by setting the addition item to be proportional to the heating value, the additional increase with increase in the heating value. The maximum current I_lim corresponds to a resistance value of the wire 4. When the maximum current value I_lim is large, the resistance value is also large. Thus, addition value is set to be inversely proportional to the maximum current value I_lim so that addition value decreases with increase in the maximum current value I_lim.

The subtraction item is proportional to the integration value COUNT(n−1) at the last period and is inversely proportional to the maximum value COUNT_LIM that is allowable as the integration value. The integration value depends on the temperature. When the integration value COUNT(n−1) at the last period is large, a temperature decrease from the integration value COUNT(n−1) is large. Thus, the subtraction item is set to be proportional to the integration value COUNT(n−1) at the last period. When the integration value is greater than the maximum value COUNT_LIM, the semiconductor switch 2 is interrupted. The subtraction value is calculated as a ratio of the integration value COUNT(n−1) at the last period with respect to the maximum value COUNT_LIM.

At S150, it is determined whether the semiconductor switch 2 has been interrupted. If the semiconductor switch 2 has been interrupted at S170, the determination result at S150 is YES, and if the semiconductor switch 2 has not been interrupt at S170, the determination result at S150 is NO.

When the determination at S150 is NO, the process proceeds to S160, and it is determined whether the integration value COUNT(n) at the present period is greater than the maximum value. When the integration value COUNT(n) is less than or equal to the maximum value COUNT_LIM, the above-described processes are repeated. When the integration value COUNT(n) is greater than the maximum value COUNT_LIM, the process proceeds to S170, and the semiconductor switch 2 is interrupted. When the semiconductor switch 2 is interrupted, a flag indicating the interruption is set.

When the determination at S150 is YES, the process proceeds to S180, and it is determined whether the integration value COUNT(n) is less than the maximum value COUNT_LIMR for reactivating. The maximum value COUNT_LIMR for reactivating is smaller than the maximum value COUNT_LIM used as a determination value for interruption. The maximum value COUNT_LIMR for reactivating is set to a value with which the temperature of the wire 4 can be considered to decrease a certain amount. When the determination at S180 is NO, the wire 4 may be damaged if current supply to the wire 4 is restarted. Thus, the interruption state of the semiconductor switch 2 is maintained. When the determination at S180 is YES, the process proceeds to S190, and the semiconductor switch 2 is reactivated.

In the present embodiment, the addition and subtraction circuit 7 calculates the integration value COUNT(n) at the present period by adding the addition and subtraction value to the integration value COUNT(n−1) at the last period, and the integration value COUNT(n) is compared with the maximum value COUNT_LIM and the maximum value COUNT_LIMR for reactivating. Then, the control circuit 5 controls the on-off state of the semiconductor switch 2 based on the comparison result. The addition and subtraction circuit 7 can calculate the integration value using Equation 5. Also in the present case, effects similar to the effects of the above-described embodiments can be achieved.

Also in the present embodiment, the subtraction value may be a fixed value when the load current value I is less than or equal to the maximum current value that is capable of steadily flowing in the wire 4 without deteriorating the wire 4 as the overcurrent protection object.

The circuit configurations of the overcurrent protection circuit 1 according to the above-described embodiments are merely examples and can be modified appropriately. The number of the channels provided in the overcurrent protection circuit 1 is not limited to 2 as described in the second embodiment. In the above-described embodiment, the examples of calculating the addition value determined at the addition value determination circuit 7a are described. In another embodiment, the addition value determination circuit 7a may determine the addition value using other method. In the above-described embodiment, the multiplexer 6c switches the detection signal corresponding to the load current value I and the temperature detection signal detected by the temperature detection circuit 6b and transmits to the AD converter 6d. In another embodiment, two AD converters 6d may be provided, and the detection signal and the temperature detection signal may be transmitted to the AD converters 6d, respectively. When the multiplexer 6c is used, the detection signal corresponding to the load current value I and the temperature detection signal switched by the multiplexer 6c can be digitalized using only one AD converter 6d.

In the first embodiment, examples of determining the addition value by the addition value determination circuit 7a and examples of determining the subtraction value by the subtraction circuit 7d are described. In another embodiment, the addition value and the subtraction value may be calculating using the same expression. For example, the addition value may be added when the load current I is greater than the predetermined value and the subtraction value may be subtracted when the load current value I is less than or equal to the predetermined value.

In the above-described embodiments, the load current value I is corrected with respect to the temperature of the semiconductor switch 2. The correction may be performed before or after calculating the addition value.

In the above-described embodiment, the wire 4 is described as an example of the overcurrent protection object. The overcurrent protection object may be other than the wire 4. For example, the overcurrent protection object may be the semiconductor switch 2 including the power MOSFET or the load 3 including a lamp, and the overcurrent protection circuit 1 may restrict the overcurrent from flowing to the semiconductor switch 2 or the load 3 so that the electric current flowing to the semiconductor switch 2 or the load 3 is limited within allowable current range.

Fifth Embodiment

An overcurrent protection circuit 101 according to a fifth embodiments of the present disclosure will be described The overcurrent protection circuit 101 can be disposed, for example, in a vehicle, and can function as a power supply device that supplies electric power to loads coupled with a wire (wire harness). The overcurrent protection circuit 101 detects an overcurrent that flows in the wire to protect the load.

Figure 9:
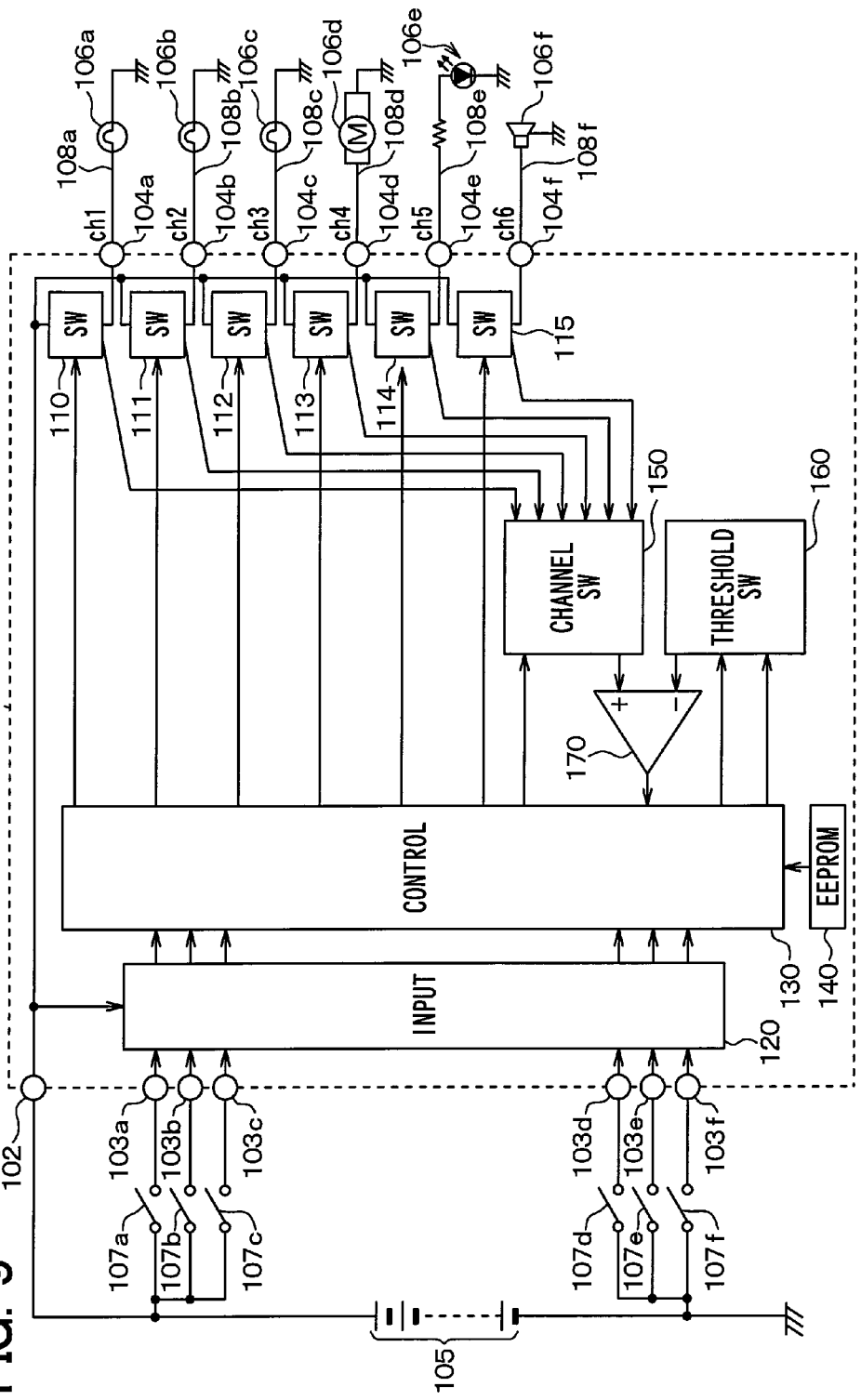
FIG. 9 is a block diagram showing an overcurrent protection circuit according to a fifth embodiment of the present disclosure.

As shown in FIG. 9, the overcurrent protection circuit 101 includes a plurality of semiconductor switches (SW) 110-113, an input circuit (INPUT) 120, a control circuit (CONTROL) 130, an electrically erasable programmable read-only memory (EEPROM) 140, a channel switching circuit (CHANNEL SW) 150, a threshold value switching circuit (THRESHOLD SW) 160, and a comparison circuit 170.

The overcurrent protection circuit 101 includes a power source terminal 102, a plurality of input terminals 103a-103f, and a plurality of output terminals 104a-104f. The power source terminal 102 is coupled with a power source. The overcurrent protection circuit 101 operates based on electric power supplied from the power source 105. The electric power is supplied from the power source 105 to a plurality of loads 106a-106f via the plurality of output terminals 104a-104f.

The input terminals 103a-103f transmit command signals for driving the loads 106a-106f to the control circuit 130 via the input circuit 120. As shown in FIG. 9, the input terminals 103a-130f are coupled with switches 107a-107f, respectively. When the switches 107a-107f are turned on, for example, the input terminals 103a-103c are at a power source potential and the input terminals 103d-103f are at a ground potential.

The output terminals 104a-104f are coupled with the loads 106a-106f via wires 108a-108f, respectively. Thus, the loads 106a-106f are supplied with electric power via the wires 108a-108f, respectively. Each of the loads 106a-106f may be, for example, a lamp, a motor, an LED, or a horn. A diameter and a material of each of the wires 108a-108f may be selected in accordance with the loads 106a-106f coupled with the wires 108a-108f.

In the overcurrent protection circuit 101, each of the output terminals 104a-104f coupled with the loads 106a-106f is regarded as a channel. Because the overcurrent protection circuit 101 includes 6 output terminals 104a-104f, the overcurrent protection circuit 101 includes 6 channels.

The semiconductor switches 110-115 are respectively coupled between the power source terminal 102 and the output terminals 104a-104f and respectively drive the loads 106a-106f. Each of the semiconductor switches 110-115 may include, for example, a power MOSFET, an IGBT, or a bipolar transistor. When the semiconductor switches 110-115 are formed of n-type MOSFETs, drains of the semiconductor switches 110-115 are coupled with the power source terminal 102, and sources of the semiconductor switches 110-115 are respectively coupled with the output terminals 104a-104f. Gates of the semiconductor switches 110-115 are coupled with the control circuit 130. The channel switching circuit 150 receives detection signal corresponding to electric current supplied to the loads 106a-106f via the semiconductor switches 110-115. In a case where each of the semiconductor switches 110-115 includes a sensing element, a sensing current that flows from the sensing element becomes the detection signal. In a case where a shunt resistor is coupled to a low side of each of the semiconductor switches 110-115, a high side voltage of the shunt resistor becomes the detection signal.

The input circuit 120 transmits signals corresponding to potentials input from the input terminals 103a-103f, that is, signals corresponding to on-off states of the switches 107a-107f.

The control circuit 130 controls the semiconductor switches 110-115 based on the signals transmitted from the input circuit 120. When the signals transmitted from the input circuit 120 request to drive loads 106a-106f, the control circuit 130 turns on the semiconductor switches 110-115 to supply the electric power to the loads 106a-106f. Furthermore, the control circuit 130 transmits control signals to the channel switching circuit 150 and the threshold value switching circuit 160 for performing an overcurrent detection. The channel switching circuit 150, the threshold value switching circuit 160, and the comparison circuit 170 detect electric current. The overcurrent protection circuit 101 performs an overcurrent level determination based on the detection result of the electric current and detects an overcurrent by performing a predetermined calculation based on a result of the overcurrent level determination. When the overcurrent protection circuit 101 detects an overcurrent, the control circuit 130 limits the power supply to the loads 106a-106f via the semiconductor switches 110-115 so that the overcurrent does not flow into the wires 108a-108f. Accordingly, the overcurrent protection circuit 101 restricts a damage of the wires 108a-108f.

The EEPROM 140 is a memory that stores threshold values used for the overcurrent detection and data about diameters and materials of the wires 108a-108f coupled with the output terminals 104a-104f, types of the loads 106a-106f, and a predetermined value described later. The EEPROM 140 transmits the data to the control circuit 130. The control circuit 130 performs the overcurrent detection using the data.

The channel switching circuit 150 switches the detection signals of the semiconductor switches 110-115 to be transmitted to the comparison circuit 170 based on the control signal, specifically, a channel switching signal, transmitted from the control circuit 130.

The threshold value switching circuit 160 switches threshold values based on the control signal (specifically, the channel switching signal). A plurality of threshold values, for example, 8 threshold values, are set with respect to each channel. The threshold value switching circuit 160 switches the channels to be selected based on the channel switching signal. In addition, based on the threshold value switching circuit, the threshold value switching circuit 160 selects the threshold value to be used from the threshold values set with respect to each channel.

The comparison circuit 170 includes a comparator. The comparison circuit 170 compares the detection signal transmitted from the channel switching circuit 150 and the threshold value transmitted from the threshold value switching circuit 160 and transmits a comparison result as a result of current detection to the control circuit 130. Based on the comparison result, the control circuit 130 performs the predetermined calculation, and compares the calculation result with a threshold value for determining an overcurrent. Accordingly, the control circuit 130 detects an overcurrent.

Figure 10:
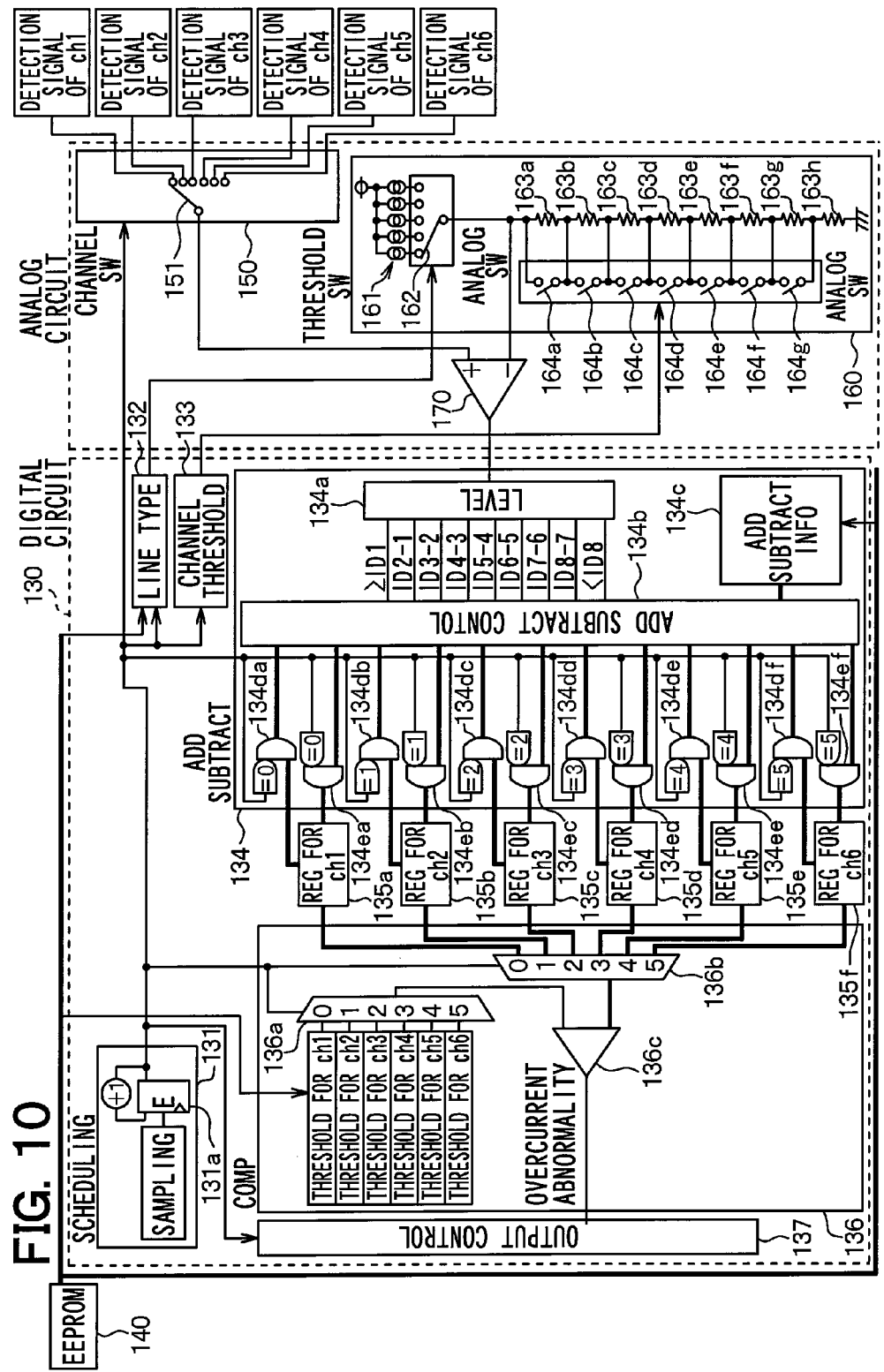
FIG. 10 is a diagram showing a part of the overcurrent protection circuit shown in FIG. 9.

As shown in FIG. 10, the control circuit 130 includes a scheduling circuit (SCHEDULING) 131, a line type threshold value switching circuit (LINE TYPE) 132, a channel threshold value switching circuit (CHANNEL THRESHOLD) 133, an addition and subtraction circuit (ADD SUBTRACT) 134, a plurality of registers (REG) 135a-135f, a comparison circuit (COMP) 136, and an output control circuit (OUTPUT) 137.

The scheduling circuit 131 performs a time division control of various circuits 132-137 in the control circuit 130, the channel switching circuit 150, and the threshold value switching circuit 160 with respect to each of the loads 106a-106f. Accordingly, the channels ch1-ch6 share the various circuits 132-137 in the control circuit 130, the channel switching circuit 150, and the threshold value switching circuit 160.

As shown in FIG. 10, the scheduling circuit 131 includes a flip flop 131a. The scheduling circuit 131 transmits a signal with a predetermined period (e.g., 0.16 ms) while adding 1 to an output signal of the flip flop 131a. Because the overcurrent protection circuit 101 has 6 channels (ch1-ch6), signals corresponding to 0, 1, . . . , 5 are output with a period of 0.16 ms. When a signal corresponding to is output, the flip flop 31a is reset, and then a signal corresponding to 0 is output again. For example, signals corresponding to 0-5 can indicate ch1-ch6 in such a manner that a signal corresponding to 0 indicates ch1 and a signal corresponding to 1 indicates ch2.

Thus, the scheduling circuit 131 transmits channel switching signals for switching the channel from ch1 to ch6 in 1 ms. Accordingly, the overcurrent protection circuit 101 performs the overcurrent detection with respect to each channel. The channel switching circuit 150 includes terminals to receive the detection signals of the semiconductor switches 110-115 and a switch 51 for switching a connection state of each of the terminal with the comparison circuit 170. The switch 51 is switched based on the channel switching signal from the scheduling circuit 131. Accordingly, the detection signal of each channel is transmitted to the comparison circuit 170 with the sampling period. The comparison circuit 170 compares the detection signals transmitted via the channel switching circuit 150 with the threshold values set at the threshold value switching circuit 160 to detect the electric current.

The line type threshold value switching circuit 132 transmits the channel switching signal as the control signal to the threshold value switching circuit 160 based on the signal from the scheduling circuit 131. For example, the line type threshold value switching circuit 132 reads the data about the line type of the wire 108a-108f with respect to each channel and transmits the channel switching signal so that the threshold values corresponding to the selected channel are set at the threshold value switching circuit 160.

Since the plurality of threshold values is set for each channel, the channel threshold value switching circuit 133 transmits the threshold value switching signal so that the threshold values of the selected channel are set in turn by time division control. In the present embodiment, for example, 8 threshold values are set for each channel. Thus, the channel threshold value switching circuit 160 transmits the threshold value switching signal every 0.02 ms, which is obtained by dividing the sampling period of 0.16 ms by the number of threshold values (i.e., 8).

The threshold value switching circuit 160 includes a plurality of constant current sources 161, an analog switch 162, a plurality of threshold value setting resistors 163a-163h, and a plurality of analog switches 164-164g. The constant current sources 161 generate different constant currents. The analog switch 162 can operate as a first switch section and selects one of the constant current sources 161 to be used. The analog switches 164a-164g can operate as second switch section. The analog switches 164a-164g are coupled in parallel with the threshold value setting resistors 163a-163h. The analog switch 162 is driven by the channel switching signal transmitted from the line type threshold value switching circuit 132. Accordingly, one of the constant current sources 161 corresponding to the line type of the wire 108a-108f of each channel is selected, and the constant current flows to the threshold value setting resistors 163a-163h. The threshold value switching signal transmitted from the channel threshold value switching circuit 133 is used for controlling on-off states of the analog switches 164a-164g. By controlling the on-off states of the analog switches 164a-164g, a voltage value (i.e., threshold value) input to an inversion input terminal of the comparison circuit 170 is controlled, and the threshold value is switched. For example, the analog switch 164a-164g are turned on in turn each time the threshold value switching signal, which divided in time, is input, and thereby the threshold value is switched.

The addition and subtraction circuit 134 includes an overcurrent level determination portion (LEVEL) 134a, an addition and subtraction control portion (ADD SUBTRACT CONTROL) 134b, an addition and subtraction value storing portion (ADD SUBTRACT INFO) 134c, a plurality of readout circuits 134da-134df, and a plurality of write circuits 134ea-134ef.

The comparison circuit 170 transmits the comparison result of the detection signal of each channel transmitted via the channel switching circuit 150 (e.g., a current corresponding voltage of each channel) and the threshold value set at the threshold value switching circuit 160 to the overcurrent level determination portion 134a. The overcurrent level determination portion 134a determines which level of ID1 to ID8 the overcurrent level corresponds based on the comparison result of the comparison circuit 170 and transmits the determination result to the addition and subtraction control portion 134b. For example, the current threshold values ID1 to ID8 are set in such a manner that ID8<ID7<ID6< . . . <ID1.

The overcurrent level determination portion 134a transmits a signal indicating which current threshold value the detection signal exceeds, that is, whether the detection signal I is greater than or equal to ID1, whether the detection signal satisfies a relationship of ID2≤I<ID1 (hereafter, referred to as ID2-1), ID3-2, ID4-3, ID5-4, ID6-5, ID7-6, or ID8-7, or whether the detection signal is less than ID8, to the addition and subtraction control portion 134b.

The addition and subtraction control portion 134b adds and subtracts predetermined values corresponding to the overcurrent level determined by the overcurrent level determination portion 134a. The addition and subtraction control portion 134b performs calculation corresponding to the overcurrent level with respect to each of the loads 106a-106f (i.e., each of the channels ch1-ch6). The addition and subtraction control portion 134b may perform addition or subtraction with software by a microcomputer, or the addition and subtraction control portion 134b may perform addition or subtraction with a digital circuit of hardware.

The addition and subtraction information storing portion 134c reads the data stored in the EEPROM 140 and stores information about a relationship between the addition value, the subtraction value, and the overcurrent level. The addition and subtraction control portion 134b performs the addition and subtraction using the information.

FIG. 11 is a diagram showing an example of information stored in the addition and subtraction information storing portion 134c, that is, an example of information about a relationship between the overcurrent level, the addition value, and the subtraction value. In FIG. 11, "X" indicates the current threshold value of ID5. A value of ID5(X) indicates a continuous energization allowable value of the wires 108a-108f, that is, a continuous energization allowable value (continuous energization allowable current value) of the loads 106a-106f. In addition, "Y" indicates a current threshold value of ID6. As described above, the current threshold values ID5 and ID6 are variable value. For example, ID5 may be 8 A, and ID6 may be 7.6 A, which is 95% of ID5.

The addition value is proportional to the square of the detection current value. Since the addition value is proportional to the square of the current value, the addition value is proportional to a heating value of Joule's heat. In the present embodiment, the additional value is set to 10 times the square of the lower limit of the detection current in each detection current range. The subtraction value is proportional to the square of the continuous energization allowable value of the wires 108a-108f, that is, a heat radiation value depending on the wires 108a-108f. The addition value and the subtraction value are previously calculated and are stored in the addition and subtraction information storing portion 134c via the EEPROM 140. Because the subtraction value is calculated by multiplying 10, a first decimal place of the square of ID5 can be a fixed point and a digital processing can be performed easily.

As shown in FIG. 11, the addition value and the subtraction value previously set in accordance with the detection current range. The addition and subtraction circuit 134 has information about the switching state of the channel switching circuit 150 and which threshold value is set at the threshold value switching circuit 160. For example, when the overcurrent level determination portion 134a determines the electric current is in ID3-2, the addition value of 9000 and the subtraction value of ID5$^2$×10 are added and subtracted with respect to the selected channel.

The addition and subtraction control portion 134b adds and subtracts the predetermined value depending on the overcurrent level determined by the overcurrent level determination portion 134a at the present period with respect to the last calculation result using the predetermined value depending on the overcurrent level determined at the last period. The calculation result using the predetermined value depending on the overcurrent level determined at the last period is stored in register 135a-135f with respect to each channel. Thus, the addition and subtraction control portion 134b reads out the calculation results stored in the registers 135a-135f with the readout circuits 134da-134df provided with respect to each channel. The present calculation result is stored in the registers 135a-136f with the write circuit 134ea-134ef provided with respect to each channel.

Because the addition value and subtraction value are previously set, the addition and subtraction control portion 134b calculates the last calculation result+(the addition value proportional to the square of the detection current value)−(the subtraction value proportional to the square of the continuous energization allowable value of the wire 108a-108f). When the detection current value is less than ID8, the addition and subtraction control portion 134b adds 0 and subtracts ID5$^2$×10.

Each of the readout circuits 134da-134df and each of the write circuits 134ea-134ef reads out data from or writes data to the corresponding one of the registers 135a-135f when the signal transmitted from the scheduling circuit 131 corresponds to the channel set to each of the readout circuits 134da-134df and each of the write circuits 134ea-134ef. Thus, the addition and subtraction circuit 134 calculates from ch1 to ch6 with the sampling period.

Even after the control circuit 130 turns off the semiconductor switches 110-115, the addition and subtraction control portion 134b continues the subtraction of the predetermined value. After the semiconductor switches 110-115 are turned off, the overcurrent level determination portion 134a detects the electric current less than ID8. Thus, the addition value becomes 0, and the subtraction value becomes ID5$^2$×10. Thus, the addition and subtraction control portion 134b adds 0 and subtracts ID5$^2$×10, that is, the addition and subtraction control portion 134b substantially subtracts ID5$^2$×10. Thus, after the semiconductor switches 110-115 are turned off, the addition and subtraction control portion 134b continues the subtraction. When the calculation result becomes a negative value, the addition and subtraction control portion 134b determines that it becomes a temperature steady state and a deemed calculation result is set to 0.

Figure 12:
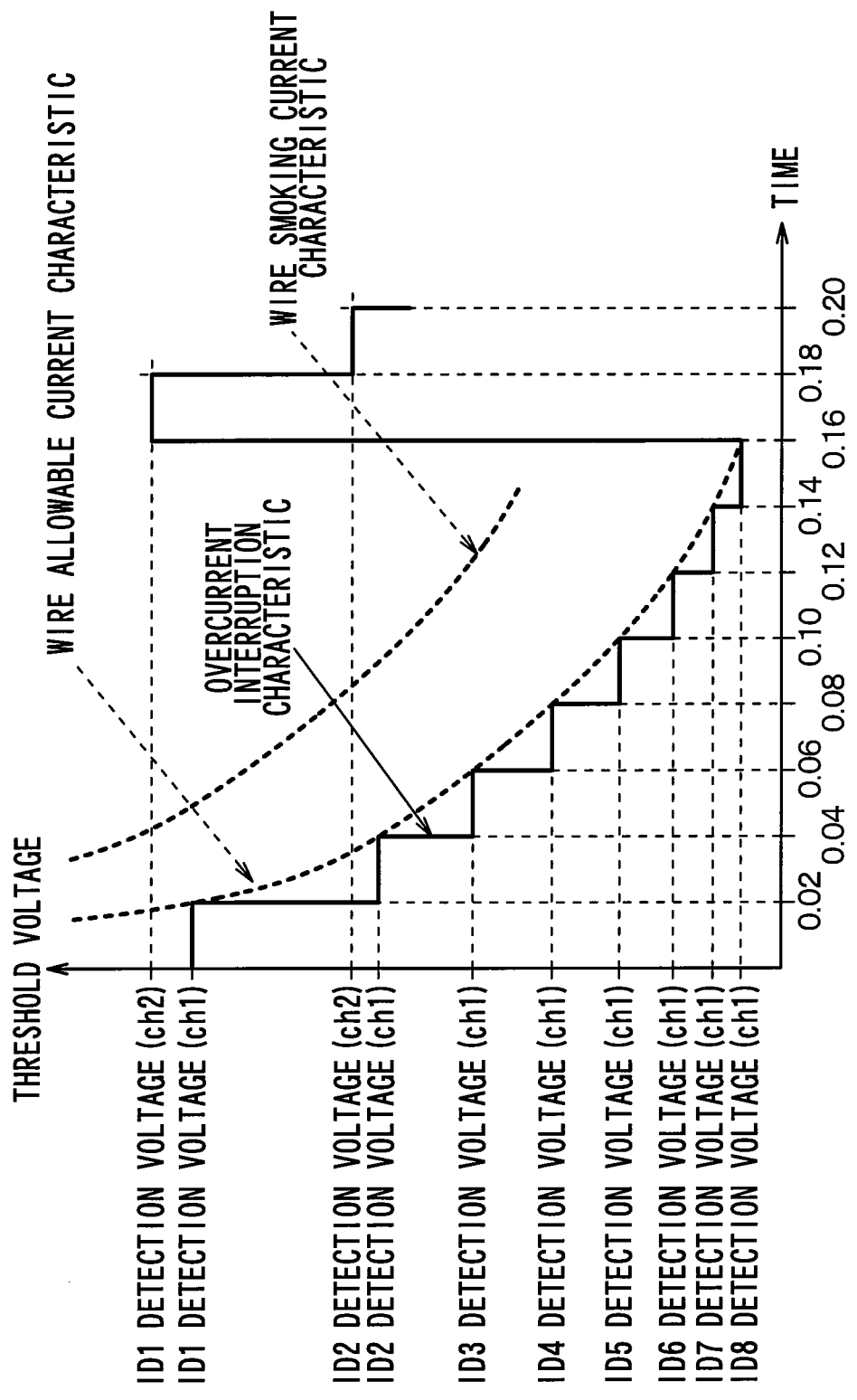
FIG. 12 is a graph showing an overcurrent interruption characteristic of the overcurrent protection circuit according to the fifth embodiment.

FIG. 12 is a diagram showing an overcurrent interruption characteristic of the overcurrent protection circuit 101 according to the present embodiment. The horizontal axis represents time and the vertical axis represents current value. In this example, it is assumed that the maximum environmental temperature of the wires 108a-108f is 60° C., and the line types are AVS line or AVSS line. Allowable temperatures of the AVS line and the AVSS line are 80° C. and smoking temperatures of AVS line and the AVSS line are 150° C. Thus, at the environmental of 60° C., for example, the wire allowable current characteristic may be set so that a temperature increase $\Delta T=20°$ C., and the wire smoking current characteristic may be set so that a temperature increase $\Delta T=90°$ C. The wire allowable current characteristic corresponds to a case where the total of addition and subtraction is from 300000 to 600000 (depending on the wire diameter). By setting the threshold value based on the total of addition and subtraction, the overcurrent interruption characteristic can approach the wire allowable current characteristic.

In the present embodiment, the threshold value switching circuit 160 sets 8 threshold values. Thus, the overcurrent interruption characteristic has 8-step shape. When the number of threshold values set by the threshold value switching circuit 160 is increased or when an AD converter is used, a resolution of electric current can be improved and a step-shaped characteristic can be smoothed, and the overcurrent interruption characteristic can approach the wire allowable current characteristic. The wire allowable current characteristic corresponds to a thermal capacity characteristic required to be interrupted and depends on the diameter and the material of the wire.

In the present embodiment, the overcurrent protection circuit 101 is used in a load steady region where the overcurrent interruption characteristic approaches the wire allowable current characteristic. The overcurrent protection circuit 101 may be applied to the smoking region or a middle range between the load steady region and the smoking region.

Each of the registers 135a-135f shown in FIG. 10 stores the calculation result of the addition and subtraction circuit 134 in a storage area provided with respect to each of the loads 106a-106f. When the register 135a-135f is provided with respect to each channel, a calculation of one of the loads 106a-106f can be performed in a state where the calculation result of another of the loads 106a-106f is stored in the corresponding one of the registers 135a-135f. Thus, the addition and subtraction circuit 134 can be shared by the loads 106a-106f.

The comparison circuit 136 compares the threshold value and the calculation result of the addition and subtraction circuit 134 with respect to each channel for determining whether an overcurrent flows. The comparison circuit 136 includes two selectors 136a, 136b and a digital comparator 136c.

The selector 136a transmits the threshold value set for each channel based on the signal transmitted from the scheduling circuit 131. The threshold value for each channel is stored in the EEPROM. The selector 136b transmits the calculation result stored in each of the registers 135a-135f to the digital comparator 136c based on the signal transmitted from the scheduling circuit 131.

When the calculation result of the addition and subtraction circuit 134 transmitted from the selector 136b is greater than a first determination threshold value (threshold values for ch1 to ch6) transmitted from the selector 136a, the digital comparator 136c determines that an overcurrent flows and transmits a high signal. As described above, the selectors 136a, 136b transmit the first determination threshold value or the calculation result corresponding to the selected channel based on the signal transmitted from the scheduling circuit 131. Thus, the digital comparator 163c compares the first determination threshold value set for each channel and the calculation result from ch1 to ch6 in turn.

The output control circuit 137 operates as an output portion of the control circuit 130. The output control circuit 137 transmits signals to control the semiconductor switches 110-115 based on input conditions. The input conditions include that any one of the switches 107a-107f is turned on and the comparison result indicating a detection of overcurrent is transmitted from the comparison circuit 136. When the calculation result of the addition and subtraction circuit 134 is greater than the first determination threshold value and the output control circuit 137 receives the high signal from the comparison circuit 136, the output control circuit 137 turns off the semiconductor switches 110-115 or limits the electric current that flows from the semiconductor switches 110-115 to the loads 106a-106f. Accordingly, the overcurrent protection circuit 101 protects the wires 108a-108f from the overcurrent.

The control circuit 130 further has a second determination threshold value that is smaller than the first determination threshold value. When the calculation result of the addition and subtraction circuit 134 becomes less than or equal to the second determination threshold value, the control circuit 130 turns on the semiconductor switches 110-115 again. Accordingly, when the overcurrent stops flowing to the wires 108a-108f, the loads 106a-106f operate again. Even if the semiconductor switches 110-115 are turned off, the semiconductor switches 110-115 are tuned on after a predetermined time. Thus, the operations of the loads 106a-106f, which are interrupted once, can be restarted.

In the example shown in FIG. 10, the digital comparator 136c compares the first determination threshold value and the total of addition and subtraction. The comparison between the second determination threshold value and the total of addition and subtraction can be performed by a digital comparator which is not shown. The above are the whole configuration of the overcurrent protection circuit 101.

Figure 13:
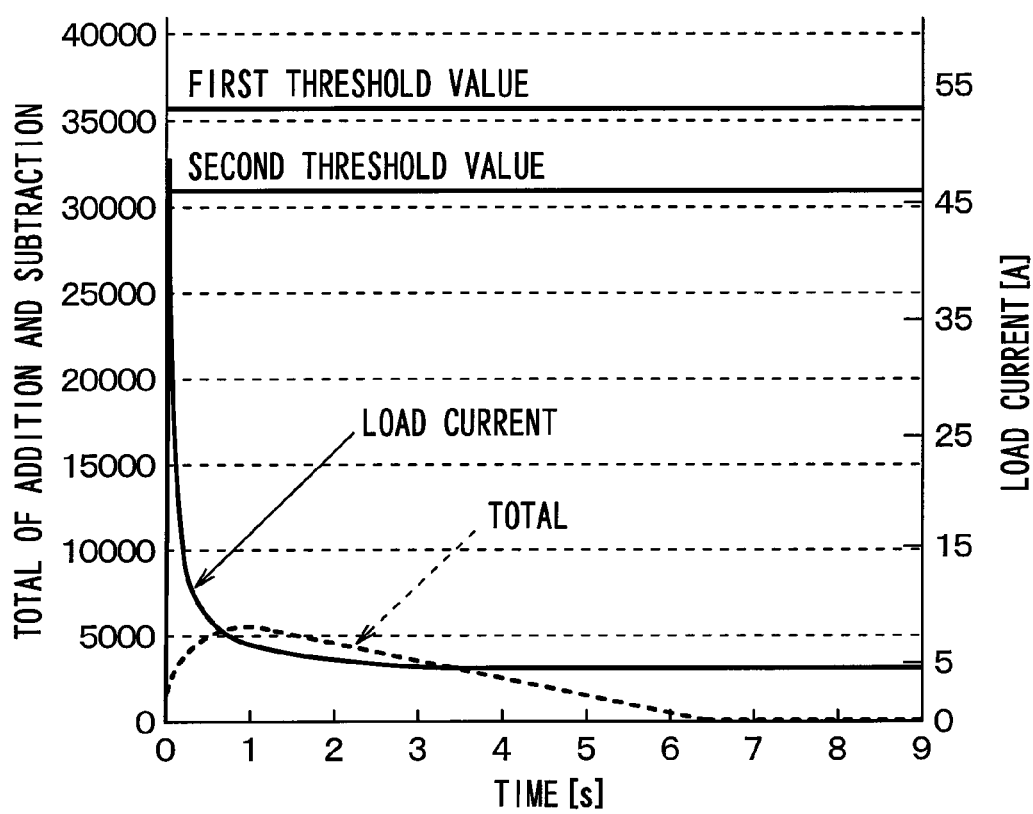
FIG. 13 is a graph showing a load current and a total of addition and subtraction when a steady load current flows to a head lamp as a load.
Figure 14:
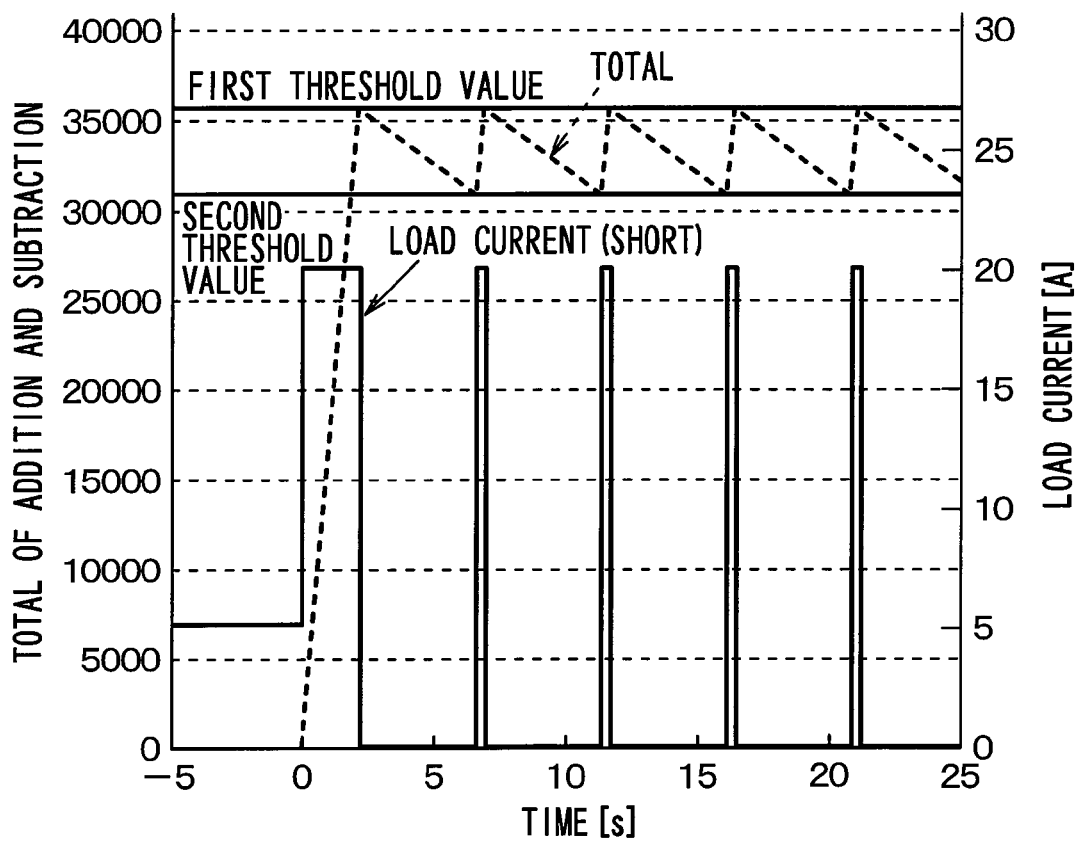
FIG. 14 is a graph showing a load current and a total of addition and subtraction when a load short flows to a load.

Next, an example of an operation of the overcurrent protection circuit 101 will be described with reference to FIG. 13 and FIG. 14. In the present example, one of the loads 106a-106f is a head lamp. FIG. 13 is a diagram showing the load current and the total of addition and subtraction when a steady load current flows to the head lamp. FIG. 14 is a diagram showing a load current and a total of addition and subtraction when a load short current (i.e., overcurrent) flows to the loads 106a-106f.

In FIG. 13 and FIG. 14, the horizontal axis represents time and the vertical axis represents the total of addition and subtraction or the load current. FIG. 13 and FIG. 14 show the load current of one of the channels.

Although there are 6 channels, an operation of the overcurrent protection circuit 101 to the load current that flows to one of the channels (head lamp) will be described below. Because the channels ch1-ch6 are switched with the predetermined sampling period by the scheduling circuit 131, the operation of the overcurrent protection circuit 101 to the channels ch1-ch6 are the same.

When the switches 107a-107f are controlled and the control circuit 130 turns on the desired semiconductor switch 110-115, a rush current flows as shown in FIG. 13. Based on the comparison result of the comparison circuit 170, the overcurrent level determination portion 134a transmits a determination result depending on the rush current to the addition and subtraction control portion 134b. The addition and subtraction control portion 134b adds and subtracts the addition value and the subtraction value corresponding to the detection current to the last calculation result.

In a case where 0 is stored as a calculation result in each of the registers 135a-135f, when the switches 107a-107f are turned on and the rush current starts to flow, the addition and subtraction control portion 134b performs the addition and subtraction with respect to 0 and stores the calculation result in the registers 135a-135f. Also in a case where the last calculation result is not 0, the addition and subtraction control portion 134b performs the addition and subtraction with respect to the last calculation result.

As shown in FIG. 13, when the rush current flows, a large current instantaneously flows and the electric current rapidly decreases. Thus, the electric current determined by the overcurrent level determination portion 134a rapidly decreases with time, and the addition value also decreases. As shown in FIG. 13, the total value of addition and subtraction increases when the rush current flows. However, when the rush current stops and the electric current becomes stable, the subtraction value becomes greater than the addition value. Accordingly, the total of addition and subtraction gradually decreases to 0.

When the steady load current flows, as shown in FIG. 13, the total of addition and subtraction is not greater than the first determination threshold value. Thus, comparison circuit 136 does not determine that an overcurrent flows, the control circuit 130 does not turn off the semiconductor switches 110-115 and the control circuit 130 does not limit the electric current that flows to the loads 106a-106f.

In contrast, as shown in FIG. 14, when an overcurrent flows to the wires 108a-108f, a large current keeps flowing differently from a case when the rush current flows. The total of addition and subtraction increases as long as the overcurrent keeps flowing, and the total of addition and subtraction becomes greater than the first determination threshold value. Thus, the control circuit 130 turns off the semiconductor switches 110-115.

Accordingly, the electric current stops flowing to the wires 108a-108f, and the load current becomes 0. The overcurrent level determination portion 134a keeps detecting the electric current of 0, and the addition and subtraction control portion 134b adds and subtracts the addition value and the subtraction value corresponding to the electric current of 0. In this case, the subtraction value is greater than the addition value. Thus, substantially, the addition and subtraction control portion 134b subtracts a constant subtraction value from the last calculation result.

When the subtraction value is subtracted from the last calculation result and the total of addition and subtraction becomes less than or equal to the second determination threshold value, the control circuit 130 turns on the semiconductor switches 110-115 or the control circuit 130 limits the electric current that flows from the semiconductor switches 110-115 to the loads 106a-106f. Accordingly, the electric current flows to the wires 108a-108f again. If the electric current is an overcurrent, the total of addition and subtraction exceeds the first determination threshold value again, and the semiconductor switches 110-115 are turned off.

After that, the total of addition and subtraction becomes less than or equal to the second determination threshold value, the semiconductor switches 110-115 are turned on. However, because the overcurrent flows to the wires 108a-108f, the total of addition and subtraction exceeds the first determination threshold value and the semiconductor switches 110-115 are turned off or the electric current that flows from the semiconductor switches 110-115 to the loads 106a-106 is limited. The above-described operation is repeated. In this way, the overcurrent protection circuit 101 detects an overcurrent and protects the wires 108a-108f and the loads 106a-106f.

In the above-described example, when the total of addition and subtraction becomes less than or equal to the second determination threshold value, the semiconductor switches 110-113 are turned on again (retry operation). In another example, the semiconductor switches 110-115 may be kept turned off (latch operation). The retry operation and the latch operation may be selected based on a memory content of the EEPROM 140.

As described above, in the present embodiment, the operation in which the addition value and the subtraction value corresponding to the detection current are added and subtracted with respect to the last calculation result of the addition and subtraction circuit 134, and an overcurrent is detected by comparing the total of addition and subtraction and the first determination threshold value. Thus, the overcurrent protection circuit 101 can detect an overcurrent with a simple circuit.

In the present embodiment, the value proportional to the square of the detection current is previously set as the addition value, and a variable that is a heat radiation value of each of the wires 108a-108f are previously set as the subtraction value. Thus, the overcurrent protection circuit 101 does not need a conversion circuit that calculates the square of the detection current in an analog manner or a digital manner and a complicated circuit that calculates the heat radiation value of each of the wires 108a-108f when the electric current flows into each of the wires 108a-108f. Thus, the overcurrent protection circuit 101 can have a simple configuration.

In the present embodiment, the overcurrent detection is performed with respect to the plurality of channels with the predetermined sampling period using the scheduling circuit 131. In other words, the channel switching circuit 150 selects the channel to be the overcurrent detection object, and the threshold value switching circuit 160 sets the plurality of threshold values of each channel in turn, and the current detection of each channel is performed with the comparison circuit 170 including one comparator. Thus, the determination of the plurality of current levels can be performed with one comparator. Thus, the overcurrent protection circuit 101 does not need many comparators. Accordingly, increase in size of the circuit and increase in cost can be restricted.

Furthermore, the addition and subtraction circuit 134 is also shared by the loads 106a-106f. Thus, a digital circuit can be obtained with a low cost.

Each of the semiconductor switches 110-115 can operate as a load drive section. The channel switching circuit 150, the threshold value switching circuit 160, and the comparison circuit 170 can operate as a current detection section. The control circuit 130 can operate as a control section, the overcurrent level determination portion 134a can operate as an overcurrent level determination section, and an addition and subtraction control portion 134b can operate as an addition and subtraction section.

Sixth Embodiment

An overcurrent protection circuit 101 according to a sixth embodiment of the present disclosure will be described. In the present embodiment, a configuration of a threshold value switching circuit 160 and the like are changed from the fifth embodiment, and the others are similar to the fifth embodiment. Thus, a part different from the fifth embodiment will be mainly described.

In the fifth embodiment, the threshold value switching circuit 160 switches the threshold value in the analog manner using the analog switches 162, 64a-164g. In the present embodiment, the threshold value is switched in a digital manner.

Figure 15:
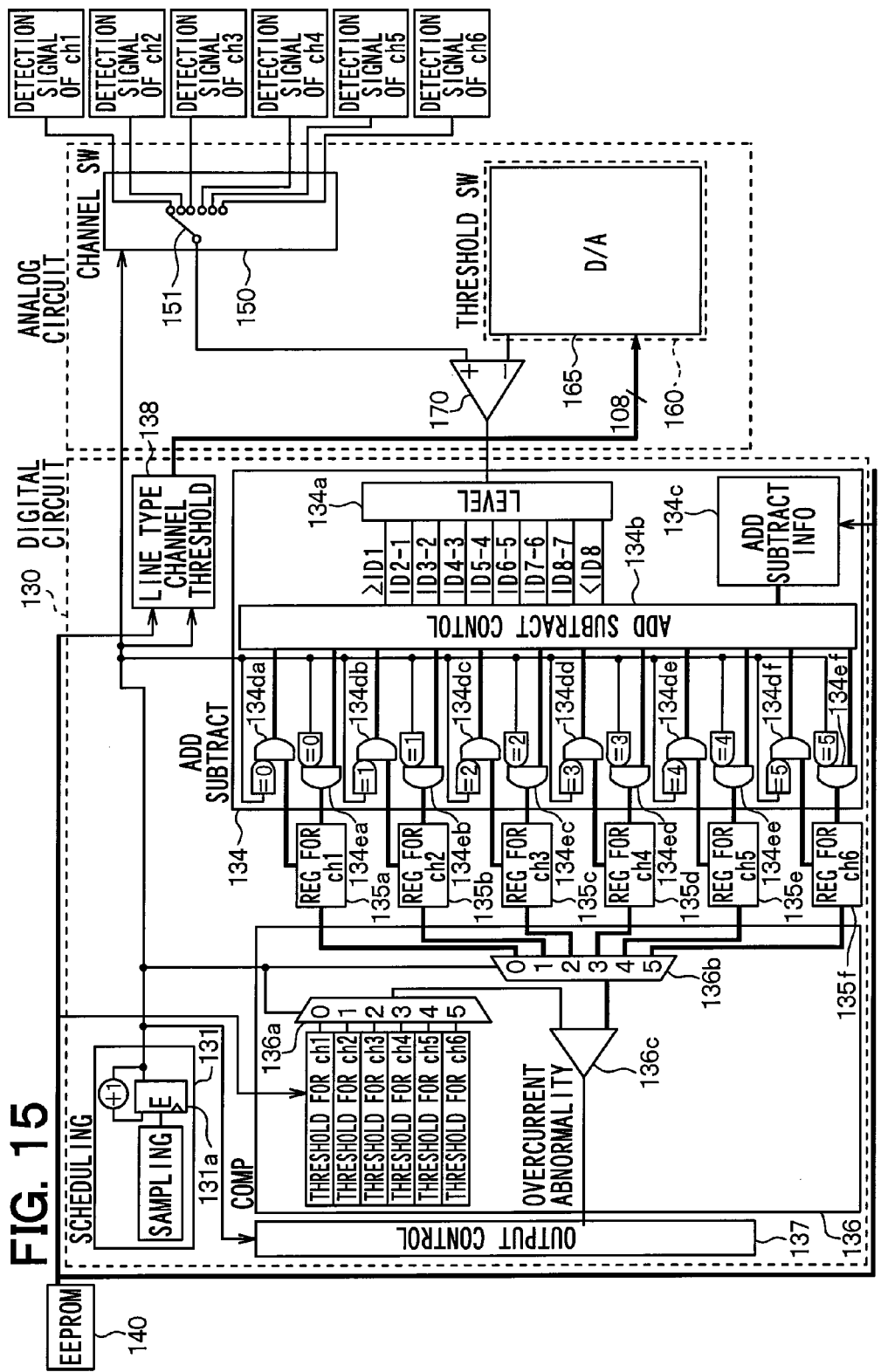
FIG. 15 is a diagram showing a part of an overcurrent protection circuit according to a sixth embodiment of the present disclosure.

As shown in FIG. 15, the overcurrent protection circuit 101 according to the present embodiment includes a line-type channel threshold value switching circuit (LINE TYPE CHANNEL THRESHOLD) 138 instead of the line type threshold value switching circuit 132 and the channel threshold value switching circuit 133. The threshold value switching circuit 160 includes a digital-to-analog (DA) converter 165.

The line type channel threshold value switching circuit 138 transmits the channel switching signal and the threshold value switching signal. The channel switching signal and the threshold value switching signal are transmitted to the DA converter 165, for example, via an 8-bit line. Based on the signals, the DA converter 165 selects the channel to be the overcurrent detection object and the threshold value to be used for determining an overcurrent. Accordingly, the overcurrent protection circuit 101 can detects the electric current for each channel.

In the above-described embodiment, the channel switching signal and the threshold value switching signal are transmitted using the 8-bit line, and a resolution of the DA converter 165 sets the threshold values of each channel to 8 levels. When the resolution of the DA converter 165 increases, the threshold values can be set more finely. In this case, a signal line that can transmit more data is required.

Seventh Embodiment

An overcurrent protection circuit 101 according to a seventh embodiment of the present disclosure will be described. In the present embodiment, the addition value and the subtraction value used in the addition and subtraction by the addition and subtraction control portion 134b are changed from the fifth embodiment. Because others are similar to the fifth embodiment, only a part different from the fifth embodiment will be described.

FIG. 16 is a diagram showing an example of information stored in the addition and subtraction information storing portion 134c, that is, an example of information about a relationship between the overcurrent levels, the addition values, and the subtraction values. As shown in FIG. 16, when the detection current value I detected at the overcurrent detection circuit 130 satisfies a relationship of I≥ID1, the addition value is 128 and the subtraction value is −1. When the detection current value I satisfies a relationship of ID2≤I<ID1, the addition value is 64 and the subtraction value is −1. When the detection current value I satisfies a relationship of ID3≤I<ID2, the addition value is 32 and the subtraction value is −1. When the detection current value I satisfies a relationship of ID4≤I<ID3, the addition value is 16 and the subtraction value is −1. When the detection current value I satisfies a relationship of ID5≤I<ID4, the addition value is 8 and the subtraction value is −1. When the detection current value I satisfies a relationship of ID6≤I<ID5, the addition value is 4 and the subtraction value is −1. When the detection current value I satisfies a relationship of ID7≤I<ID6, the addition value is 2 and the subtraction value is −1. When the detection current value I satisfies a relationship of ID8≤I<ID7, the addition value is 1 and the subtraction value is −1. When the detection current value I satisfies a relationship of I<ID8, the addition value is 0 and the subtraction value is −1 or −2.

In the present example, the channel ch1-ch6 have the same addition values. Although the subtraction value is set to −1 when the detection current value I is greater than or equal to ID8 and the subtraction value is set to −1 or −2 when the detection current value I is less than ID8, the subtraction values may be changed by changing the setting of the EEPROM 140.

The addition and subtraction control portion 134b adds and subtracts the addition value and the subtraction value corresponding to the detection current value using the information of the addition value and the subtraction value.

Even when the information about the addition value and the subtraction value is used, an operation of the overcurrent protection circuit 101 is basically similar to the fifth embodiment. As described above, the overcurrent protection circuit 101 performs overcurrent detection by adding and subtracting the addition value and the subtraction value corresponding to the detection current value detected by the overcurrent level determination portion 134a to the last calculation result.

When the information about the addition value and the subtraction value is used, the current threshold value, the addition value, and the subtraction value can be reduced, and the number also can be reduced. Thus, the amount of data can be reduced, and a size of the circuit can be reduced.

In the fifth embodiment, as shown in FIG. 11, the addition value and the subtraction value corresponding to each current threshold value are stored in the EEPROM 140. For example, when the addition value of 36000 is expressed by binary number, the addition value can be expressed with 16-digit number. Because each of large numbers is expressed by binary number and is stored in EEPROM 40, the amount of data to deal increases.

On the other hand, in the present embodiment, the addition value is the value proportional to the detection current value. Thus, by calculating the square of he detection current value, the addition values shown in FIG. 16 can be obtained. In ID2 to ID7, the detection current value becomes the square root of 2 times with increase in the current threshold value. Thus, when the detection current value is squared, the addition value is doubled. Thus, as shown in FIG. 16, the addition value is doubled in accordance with the current threshold range as 2, 4, 8, . . . , 128.

Because the equation for calculating the detection current value is common to the wires 108a-108f, the addition values are common to the wires 108a-108f. The number of the addition value is 3-digit value at the maximum and the value is expressed by binary number. Compared with the addition values of the fifth embodiment shown in FIG. 11, the addition values according to the present embodiment are obviously smaller. Thus, even when the addition value is expressed by binary number, the number of digits does not increase, the amount of data to deal can be reduced, and the size of the circuit can be reduced compared with the fifth embodiment.

As described above, in the present embodiment, because the magnitude and the number of the current threshold values, the addition values, and the subtraction values can be reduced, the amount of data to deal can be reduced, and the size of the circuit can be reduced.

The above-described configurations of the overcurrent protection circuits 101 according to the fifth to seventh embodiment are merely examples and may be changed suitably. For example, the number of channels provided in the overcurrent protection is not limited to 6. In the above-described embodiments, the current detection of the all channels is performed by the comparison circuit 170 including only one comparator. The above-described effects can be obtained as long as the current detection of a plurality of channels is performed by at least one comparator. For example, the comparison circuit 170 may include two comparators and each comparator may perform the current detection of 3 channels.

In the above-described embodiments, the overcurrent interruption characteristic is approached to the wire allowable current characteristic. The overcurrent interruption characteristic may be approached to the wire smoking current characteristic by changing the threshold value, the addition value, the subtraction value, and the detection current value as parameters or by the EEPROM 140.

What is claimed is:
1. An overcurrent protection circuit comprising:
a load drive section driving a load;
a wire coupled with the load and the load drive section;
a current detection section detecting a load current value of an electric current that flows to the load, the current detection section including an AD converter and a current value calculation circuit, the AD converter receiving a detection signal corresponding to the load current value and analog-to-digital converting the detection signal, the current value calculation circuit calculating the load current value from the detection signal converted by the AD converter;
an addition and subtraction section determining an addition and subtraction value based on the load current value detected by the current detection section, storing an integration result of addition and subtraction using the addition and subtraction value, and transmitting the integration result, the addition and subtraction section including an addition value determination circuit, the addition value determination circuit determining an addition value in the addition and subtraction value based on the load current value calculated by the current value calculation circuit and a function expression or information indicating a relationship between the load current value and the addition value;
a comparison circuit comparing the integration result transmitted from the addition and subtraction section with a threshold value and transmitting a signal indicating an overcurrent detection result; and
a control circuit controlling the load drive section based on the signal indicating the overcurrent detection result transmitted from the comparison circuit to limit the elec- tric current that flows to the load and the wire and to protect a protection object from an overcurrent, wherein the addition value determination circuit determines the additional value smoothly with respect to the load current value using the function expression, which indicates the relationship between the load current value and the addition value; and does not apparently relate to temperature.

2. The overcurrent protection circuit according to claim 1, wherein the load drive section includes a semiconductor switch, wherein the current detection section further includes a temperature detection circuit transmitting a temperature detection signal corresponding to a temperature of the semiconductor switch, wherein the AD converter receives the temperature detection signal transmitted from the temperature detection circuit and analog-to-digital converts the temperature detection signal, and wherein the current value calculation circuit performs a temperature correction of the load current value based on the temperature detection signal converted by the AD converter.

3. The overcurrent protection circuit according to claim 2, wherein the current detection section further includes a multiplexer that switches a signal transmitted to the AD converter between the detection signal corresponding to the load current value and the temperature detection signal transmitted from the temperature detection circuit.

4. The overcurrent protection circuit according to claim 2, wherein the current detection section further include a current correction information storing portion that stores current correction information with respect to a temperature of the semiconductor switch, and wherein the current value calculation circuit performs the temperature correction of the load current value using the current correction information stored in the current correction information storing portion in accordance with the temperature of the semiconductor switch obtained from the temperature detection signal converted by the AD converter.

5. The overcurrent protection circuit according to claim 4, wherein the current detection section further includes a voltage detection circuit that detects a drain-source voltage of the semiconductor switch as the detection signal corresponding to the load current value, wherein the current value calculation circuit calculates the load current value from the drain-source voltage and an on-resistance of the semiconductor switch, wherein the current correction information storing portion stores information about a relationship between the temperature of the semiconductor switch and the on-resistance as the current correction information, and wherein the current value calculation circuit performs the temperature correction of the load current value calculated from the drain-source voltage and the on-resistance by correcting the on-resistance in accordance with the temperature of the semiconductor switch.

6. The overcurrent protection circuit according to claim 1, wherein the addition value determination circuit calculates a value proportional to a square of the load current value and sets the addition value to the value proportional to the square of the load current value.

7. The overcurrent protection circuit according to claim 1, wherein the addition and subtraction section further includes a current determination information storing portion that includes information between the load current value and the addition value, and wherein the addition value determination circuit determines the addition value corresponding to the load current value calculated by the current value calculation circuit using the information stored in the current determination information storing portion.

8. The overcurrent protection circuit according to claim 1, wherein the addition and subtraction value includes an addition item proportional to a square of the load current value.

9. The overcurrent protection circuit according to claim 8, wherein the addition and subtraction value includes a subtraction item proportional to the integration result.

10. The overcurrent protection circuit according to claim 9, wherein the addition item in the addition and subtraction value is inversely proportional to a square of a maximum current value that is capable of steadily flowing into the protection object without deteriorating the protection object.

11. The overcurrent protection circuit according to claim 10, wherein the addition item in the addition and subtraction value is inversely proportional to a determination value for determining whether the integration result is an allowable value.

12. The overcurrent protection circuit according to claim 8, wherein the addition and subtraction section subtracts a subtraction value in the addition and subtraction value when the load current value is less than or equal to a maximum current value that is capable of steadily flowing into the protection object without deteriorating the protection object.

13. The overcurrent protection circuit according to claim 1, wherein the addition and subtraction section adds an addition value in the addition and substation value when the load current value is greater than a predetermined value and subtracts a subtraction value in the addition and subtraction value when the load current value is less than or equal to the predetermined value, and wherein the predetermined value is an allowable current value of the protection object or a smoking current value of the protection object.

14. The overcurrent protection circuit according to claim 1, wherein the threshold value includes a first determination threshold value and a second determination threshold value that is smaller than the first determination threshold value, wherein when the comparison circuit determines that the integration result is greater than the first determination threshold value, the control circuit turns off the load drive section, wherein the addition and subtraction section continues subtracting a subtraction value in the addition and subtraction value after the control circuit turns off the load drive section, and wherein when the comparison circuit determines that the integration value becomes less than or equal to the second determination threshold value, the control circuit turns on the load drive section.

15. The overcurrent protection circuit according to claim 1, wherein the load is included in one of a plurality of loads, the wire is included in a plurality of wires, the wires respectively supply the electric current to the loads, each of the wires is regarded as one channel, wherein the current detection section further includes a multiplexer, the multiplexer receives the detection signals corresponding to the load current values of the respective channels and switches the detection signal to be transmitted, and the current detection section detects the load current value for each channel, and wherein the overcurrent is detect for each channel based on the load current value detected for each channel.

16. An overcurrent protection circuit comprising:
a load drive section driving a plurality of loads;
a current detection section detecting an electric current flowing to each of the loads and transmitting a current detection value corresponding to the electric current; and
a control section including an overcurrent level determination section and an addition and subtraction section, the control section turns on and off the load drive section based on an input condition, the overcurrent level determination section determining an overcurrent level of the current detection value, the addition and subtraction section adding and subtracting predetermined values corresponding to the current detection value based on a determination result of the overcurrent level determination section,
wherein the addition and subtraction section adds and subtracts the predetermined values corresponding to the current detection value at the present time with respect to a calculation result using predetermined values corresponding to the current detection value at the last time, and the control section controls the load drive section to limit the electric current flowing to a corresponding one of the loads when a calculation result of the addition and subtraction section is greater than a determination threshold value,
wherein the current detection section includes a comparison circuit, a channel switching circuit, and a threshold switching circuit, the comparison circuit includes a single comparator transmitting the current detection value,
wherein output terminals respectively coupled with the loads are regarded as channels, the channel switching circuit selects one of the channels, and transmits a voltage corresponding to the electric current flowing to a selected channel to the single comparator, and
wherein the threshold switching circuit sets a plurality of threshold values for each of the channels, and the threshold switching circuit transmits the threshold values of the selected channel in turn to the single comparator,
wherein the single comparator compares the current detection value of each load with a corresponding threshold value.

17. The overcurrent protection circuit according to claim 16,
wherein the threshold switching circuit includes:
a plurality of constant current sources generating different constant currents;
a first switching section selecting one of the constant current sources that generates the constant current corresponding to the selected channel;
a plurality of resistors coupled with the first switching section; and
a second switching section selecting one of the resistors to receive the constant current from the one of the constant current sources selected by the first switching section, and
wherein the control section transmits control signals to the first switching section and the second switching section to select the one of the constant current sources that generates the constant current corresponding to the selected channel and to select the one of the resistors to receive the constant current.

18. The overcurrent protection circuit according to claim 16,
wherein the threshold switching circuit includes a DA converter and transmits the threshold values in turn to the single comparator based on a signal from the control section.

19. The overcurrent protection circuit according to claim 16,
wherein the addition and subtraction section continues adding and subtracting after the control section turns off the load drive section,
wherein the determination threshold value is a first determination threshold value, and
wherein the control section has a second determination threshold value that is smaller than the first determination threshold value, and the control section turns on the load drive section when the calculation result becomes less than or equal to the second determination threshold value.

20. The overcurrent protection circuit according to claim 16,
wherein the predetermined value added by the addition and subtraction section is a value proportional to a square of the detection current value.

21. The overcurrent protection circuit according claim 16,
wherein the loads are supplied with the electric current via wires, respectively,
wherein the predetermined value subtracted by the addition and subtraction section is a variable value depending on a heat radiation value of each of the wires.

22. The overcurrent protection circuit according to claim 16,
wherein the addition and subtraction section adds and subtracts the predetermined values with a predetermined sampling period.

23. The overcurrent protection circuit according to claim 16,
wherein the addition and subtraction section includes a microcomputer storing a software, and
wherein the microcomputer adds and subtracts the predetermined values using the software.

24. The overcurrent protection circuit according to claim 16,
wherein the addition and subtraction section includes a digital circuit of a hardware, and
the digital circuit adds and subtracts the predetermined values.

25. The overcurrent protection circuit according to claim 16,
wherein the control section further includes a scheduling circuit that performs a time division control of the current detection section and the addition and subtraction section for each of the loads.

26. The overcurrent protection circuit according to claim 25,
wherein the addition and subtraction section includes a storing section that stores a calculation result of the addition and subtraction section for each of the loads in a storage region provided for each of the loads.

* * * * *